US012748232B2

(12) United States Patent
Rovetta et al.

(10) Patent No.: US 12,748,232 B2
(45) Date of Patent: Sep. 29, 2026

(54) QUANTUM-ASSISTED NEAR SURFACE ANALYSIS OF SEISMIC DATA

(71) Applicant: Saudi Arabian Oil Company, Dhahran (SA)

(72) Inventors: Diego Rovetta, Delft (NL); Marcin Szymon Dukalski, Delft (NL)

(73) Assignee: Saudi Arabian Oil Company, Dhahran (SA)

( * ) Notice: Subject to any disclaimer, the term of this patent is extended or adjusted under 35 U.S.C. 154(b) by 106 days.

(21) Appl. No.: 18/495,383

(22) Filed: Oct. 26, 2023

(65) Prior Publication Data

US 2025/0138213 A1 May 1, 2025

(51) Int. Cl.
*G01V 1/50* (2006.01)
*G06N 10/20* (2022.01)

(52) U.S. Cl.
CPC ............... *G01V 1/50* (2013.01); *G06N 10/20* (2022.01); *G01V 2210/72* (2013.01)

(58) Field of Classification Search
CPC ...... G01V 1/50; G01V 2210/72; G01V 1/362; G06N 10/20
USPC ............................................................ 367/25
See application file for complete search history.

(56) References Cited

U.S. PATENT DOCUMENTS 9,026,574 B2 5/2015 Macready et al.
9,218,567 B2 12/2015 Macready et al.
10,067,255 B2 9/2018 Colombo et al.
10,386,519 B2 8/2019 Colombo et al.
10,852,450 B2 12/2020 Colombo et al.
10,920,585 B2 2/2021 Colombo et al.
11,397,273 B2 7/2022 Colombo et al.
11,403,548 B2 8/2022 Imafuku
11,574,030 B1 2/2023 Harrigan et al.
11,715,021 B2 8/2023 Okada et al.
11,768,303 B2 9/2023 Colombo et al.
(Continued)

OTHER PUBLICATIONS

Dukalski et al. ("Quantum computer-assisted global optimization in geophysics illustrated with stack-power maximization for refraction residual statics estimation." Geophysics 88.2 (2023), "Dukalski") (Year: 2023).*

(Continued)

*Primary Examiner* — Yuqing Xiao
*Assistant Examiner* — Christopher Richard Walker
(74) *Attorney, Agent, or Firm* — Fish & Richardson P.C.

(57) ABSTRACT

Systems and methods for near surface analysis of seismic data include obtaining seismic data for a subsurface formation; forming one or more seismic gathers by sorting the seismic data into a plurality of bins based on a midpoint and an offset between a source and a receiver associated with the seismic data; determining, using a hybrid classical and quantum solver, surface consistent refraction phase and amplitude residuals by maximizing the stack power of the one or more seismic gathers. A classical portion of the hybrid solver defines and partitions a stack power maximization, and a quantum portion of the hybrid solver finds a maximum stack power of the partitions through quantum annealing. Refraction-based surface consistent amplitude and phase corrections are performed on the one or more seismic gathers by applying the surface consistent refraction phase and amplitude residuals.

20 Claims, 11 Drawing Sheets

(56) References Cited

U.S. PATENT DOCUMENTS

| | | | | |
|---|---|---|---|---|
| 2015/0310350 | A1 | 10/2015 | Niskanen et al. | |
| 2018/0038976 | A1* | 2/2018 | Diallo | G01V 1/364 |
| 2019/0302298 | A1* | 10/2019 | Colombo | G01V 1/364 |
| 2019/0324167 | A1* | 10/2019 | Zhang | G06F 17/18 |
| 2021/0190983 | A1* | 6/2021 | Colombo | G01V 1/362 |
| 2022/0171083 | A1* | 6/2022 | Galaktionova | G01V 1/303 |
| 2023/0042979 | A1 | 2/2023 | Esfahani et al. | |
| 2023/0125277 | A1 | 4/2023 | Colombo et al. | |
| 2024/0210580 | A1 | 6/2024 | Colombo et al. | |

OTHER PUBLICATIONS

Van der Linde ("Quantum Annealing for Seismic Imaging." Exploring Quantum Annealing Possibilities for Residual Statics Estimation using the D-Wave Advantage System and Hybrid Solver (2021), "van der Linde") (Year: 2021).*

Colombo et al. ("Surface-consistent amplitude balancing with refracted waves." SEG International Exposition and Annual Meeting. SEG, 2018, "Colombo") (Year: 2018).*

Rovetta et al. ("Quantum annealer-assisted residual refraction statics estimation on the SEAM Arid model dataset." 84th EAGE Annual Conference & Exhibition. vol. 2023. No. 1. European Association of Geoscientists & Engineers, 2023, "Rovetta") (Year: 2023).*

Dukalski et al., "Quantum computer-assisted global optimization in geophysics illustrated with stack-power maximization for refraction residual statics estimation," Geophysics, Mar.-Apr. 2023, 88(2):V75-V91, 17 pages.

McGeoch et al., "D-Wave Hybrid Solver Service+ Advantage: Technology Update," Technical Report 14-1048A-A, Sep. 2020, 17 pages.

McGeoch et al., "Hybrid Solver for Discrete Quadratic Models," Whitepaper, Dwave, The Quantum Computing Company, Oct. 2020, 6 pages.

Okada et al., "Efficient Partition of Integer Optimization Problems with One-Hot Encoding," Scientific Reports, Sep. 2019, 9(1):1-12, 12 pages.

Oristaglio, "SEAM update: The Arid model—Seismic exploration in desert terrains," The Leading Edge, Apr. 2015, 34(4):466-468, 2 pages.

Rovetta et al., "Quantum annealer-assisted residual refraction statics estimation on the SEAM Arid model dataset," 84th EAGE Annual Conference and Exhibition, Vienna, Austria, Jun. 5-8, 2023, 5 pages.

Van Der Linde et al., "Residual Statics Estimation with Quantum Annealing," presented at the 83rd EAGE Annual Conference & Exhibition, Madrid, Spain, Jun. 6-9, 2022, 6 pages.

Van Der Linde, "Quantum Annealing for Seismic Imaging—Exploring Quantum Annealing Possibilities for Residual Statics Estimation using the D-wave Advantage System and Hybrid Solver," Thesis for the degree of Master of Science, Delft University of Technology, Nov. 2021, 57 pages.

Venegas-Andraca et al., "A cross-disciplinary introduction to quantum annealing- based algorithms," Contemporary Physics, Mar. 2018, 59(2):174-197, 31 pages.

* cited by examiner

QUANTUM-ASSISTED NEAR SURFACE ANALYSIS OF SEISMIC DATA

TECHNICAL FIELD

This disclosure generally relates to geological exploration of a subsurface formation.

BACKGROUND

In geology, sedimentary facies are bodies of sediment that are recognizably distinct from adjacent sediments that resulted from different depositional environments. Generally, geologists distinguish facies by aspects of the rock or sediment being studied. Seismic facies are groups of seismic reflections whose parameters (such as amplitude, continuity, reflection geometry, and frequency) differ from those of adjacent groups. Seismic facies analysis, a subdivision of seismic stratigraphy, plays an important role in hydrocarbon exploration and is one key step in the interpretation of seismic data for reservoir characterization. The seismic facies in a given geological area can provide useful information, particularly about the types of sedimentary deposits and the anticipated lithology.

In reflection seismology, geologists and geophysicists perform seismic surveys to map and interpret sedimentary facies and other geologic features for applications such as, for example, identification of potential petroleum reservoirs. Seismic surveys are conducted by using a controlled seismic source (for example, Vibroseis or dynamite) to create a seismic wave. The seismic source is typically located at ground surface. The seismic wave travels into the ground, is reflected by subsurface formations, and returns to the surface where it is recorded by sensors called geophones. The geologists and geophysicists analyze the time it takes for the seismic waves to reflect off subsurface formations and return to the surface to map sedimentary facies and other geologic features. This analysis can also incorporate data from sources such as, for example, borehole logging, gravity surveys, and magnetic surveys.

One approach to this analysis is based on tracing and correlating along continuous reflectors throughout the dataset produced by the seismic survey to produce structural maps that reflect the spatial variation in depth of certain facies. These maps can be used to identify impermeable layers and faults that can trap hydrocarbons such as oil and gas.

SUMMARY

In land seismic imaging, near-surface characterization is one of the most important data processing steps. The near surface in desert environments can include features such as karst, sand dunes and wadis. The near-surface features can be characterized by abrupt physical property changes (e.g., changes in seismic velocity). These changes can result in phase and amplitude distortions in the elastic wavefields propagating during a seismic acquisition. Phase distortions produce time delays in the recorded arrivals that are called statics. Long wavelength statics can be compensated through the use of an accurate velocity model. However, shallow geology can yield relative time delays for different source and receiver locations that fall below the resolution limit of the velocity model estimate. The shallow geology relative time delays are called short wavelength or residual statics. Similarly, shallow geological anomalies also affect the amplitude of the seismic signals resulting in relative variations for different source and receiver locations, called amplitude residuals.

Phase and amplitude corrections of seismic data is not trivial due to noise and unwanted signals compromising the reflection arrivals. Refracted waves, however, travel only in the near surface and are not contaminated by spurious arrivals. A surface consistent solution based on refracted waveforms can be used to compensate for phase and amplitude residuals at the seismic gather level (e.g., each trace of the gather is correlated with a pilot trace such as the stack of that gather). A cross-correlation process can suffer from cycle-skips, which are the correlation of non-corresponding peaks within the signals, possibly leading to inaccurate results.

To overcome these challenges, the systems and methods of this disclosure determine phase and amplitude residuals by maximizing the stack power of seismic gathers using a quantum annealer. A data processing system (e.g., a computer or a control system) obtains seismic data of a subsurface formation. The data processing system forms seismic gathers by sorting the seismic data into multiple bins based on a midpoint and an offset between a source and a receiver. The data processing system generates an initial velocity model based on the seismic gathers and determines long wavelength statics. The data processing system determines the surface consistent refraction phase and amplitude residuals for the seismic gathers by maximizing the stack power of the seismic gathers using a hybrid classical and quantum solver. The problem can be formulated as a Discrete Quadratic Model (DQM) and a DQM hybrid solver, combining classical and quantum optimization, can be used to find an estimate of the residuals. The quantum solver uses a Quantum Annealing (QA) machine, which is a quantum computer that uses quantum effects such as superposition and tunneling to increase the likelihood of finding the global optima in optimization problems to estimate the residuals without suffering from cycle-skips or being trapped in local optima of the objective function.

Implementations of the systems and methods of this disclosure can provide various technical benefits. The use of QA results in a global optimization that avoids cycle-skips improving the accuracy and robustness of the phase and amplitude residuals resulting in less distortions in the seismic data after correction using the residuals as compared with a cross-correlation method. The hybrid classical and quantum solver can be scaled for datasets of industrial size. The estimation of both phase and amplitude residuals lead to a more precise characterization of shallow subsurface anomalies, as compared to estimating only phase residuals, by correcting for distortions in the seismic data caused by geological features that produce more effects in the amplitude of the seismic signals than in the phase of the seismic signals, or as compared to estimating only amplitude residuals, by correcting for distortions in the seismic data caused by geological features that produce more effects in the phase of the seismic signals than in the amplitude of the seismic signals.

The details of one or more implementations of these systems and methods are set forth in the accompanying drawings and the description below. Other features, objects, and advantages of these systems and methods will be apparent from the description and drawings, and from the claims.

DESCRIPTION OF DRAWINGS

Like reference symbols in the various drawings indicate like elements.

DETAILED DESCRIPTION

This specification describes systems and methods for quantum-assisted near surface analysis of seismic data. A data processing system (e.g., a computer or a control system) obtains seismic data of a subsurface formation. The data processing system forms seismic gathers by sorting the seismic data into multiple bins based on a midpoint and an offset between a source and a receiver. The data processing system generates an initial velocity model based on the seismic gathers and determines long wavelength statics. The data processing system determines the surface consistent refraction phase and amplitude residuals for the seismic gathers by maximizing the stack power of the seismic gathers. The problem can be formulated as a DQM and a DQM hybrid solver, combining classical and quantum optimization, can be used to find an estimate of the residuals. The quantum solver uses Quantum Annealing (QA), a form of quantum computing that uses quantum effects such as superposition and tunneling to increase the likelihood of finding the global optima in optimization problems to estimate the residuals without suffering from cycle-skips or being trapped in local optima of the objective function.

Figure 1:
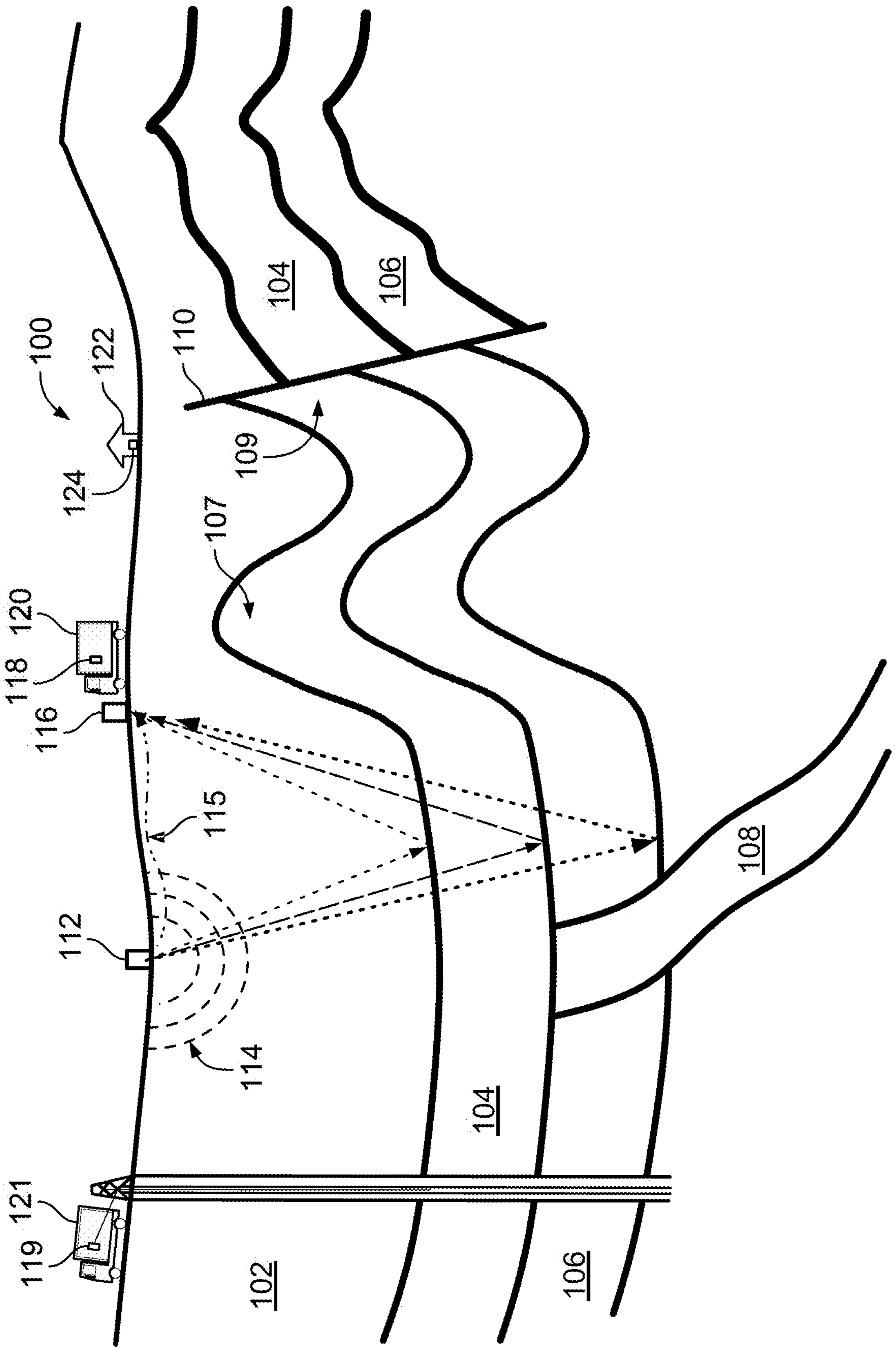
FIG. 1 is a schematic view of a seismic survey being performed to map subsurface features such as facies and faults.

FIG. 1 is a schematic view of a seismic survey being performed to map subsurface features such as facies and faults in a subsurface formation 100. The subsurface formation 100 includes a layer of impermeable cap rocks 102 at the surface. Facies underlying the impermeable cap rocks 102 include a sandstone layer 104, a limestone layer 106, and a sand layer 108. A fault line 110 extends across the sandstone layer 104 and the limestone layer 106.

A seismic source 112 (for example, a seismic vibrator or an explosion) generates seismic waves 114 that propagate in the earth. The velocity of these seismic waves depends on properties such as, for example, density, porosity, and fluid content of the medium through which the seismic waves are traveling. Different geologic bodies or layers in the earth are distinguishable because the layers have different properties and, thus, different characteristic seismic velocities. For example, in the subsurface formation 100, the velocity of seismic waves traveling through the subsurface formation 100 will be different in the sandstone layer 104, the limestone layer 106, and the sand layer 108. As the seismic waves 114 contact interfaces between geologic bodies or layers that have different velocities, the interface reflects some of the energy of the seismic wave and refracts part of the energy of the seismic wave. Such interfaces are sometimes referred to as horizons.

The seismic waves 114 are received by a sensor or sensors 116. Although illustrated as a single component in FIG. 1, the sensor or sensors 116 are typically a line or an array of sensors 116 that generate an output signal in response to received seismic waves including waves reflected by the horizons in the subsurface formation 100. The sensors 116 can be geophone-receivers that produce electrical output signals transmitted as input data, for example, to a computer 118 on a seismic control truck 120. Based on the input data, the computer 118 may generate a seismic data output such as, for example, a seismic two-way response time plot.

A control center 122 can be operatively coupled to the seismic control truck 120 and other data acquisition and wellsite systems. The control center 122 may have computer facilities for receiving, storing, processing, and/or analyzing data from the seismic control truck 120 and other data acquisition and wellsite systems. For example, computer systems 124 in the control center 122 can be configured to analyze, model, control, optimize, or perform management tasks of field operations associated with development and production of resources such as oil and gas from the subsurface formation 100. Alternatively, the computer systems 124 can be located in a different location than the control center 122. Some computer systems are provided with functionality for manipulating and analyzing the data, such as performing seismic interpretation or borehole resistivity image log interpretation to identify geological surfaces in the subsurface formation or performing simulation, planning, and optimization of production operations of the wellsite systems.

In some implementations, results generated by the computer system 124 may be displayed for user viewing using local or remote monitors or other display units. One approach to analyzing seismic data is to associate the data with portions of a seismic cube representing the subsurface formation 100. The seismic cube can also display results of the analysis of the seismic data associated with the seismic survey.

Figure 2:
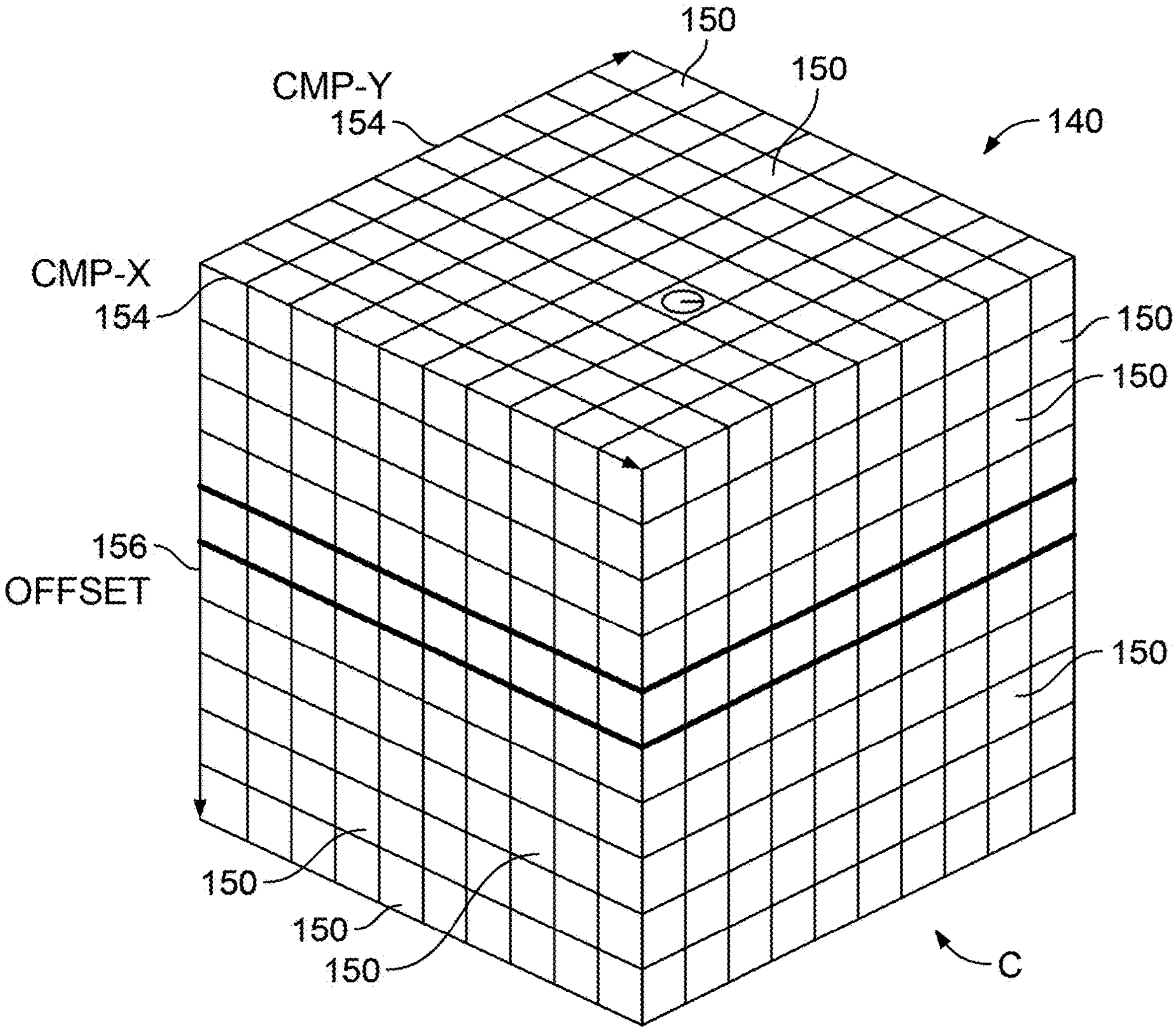
FIG. 2 illustrates a three-dimensional cube representing seismic data in a CMP-offset domain.

FIG. 2 illustrates a seismic cube 140 representing the seismic data. The seismic cube 140 is composed of a number of voxels 150. A voxel is a volume element, and each voxel contains seismic data, for example, seismic traces and its attributes such as first arrival travel times. The cubic volume C is composed along intersection axes of CMP-offset spacing data based on a Delta-X CMP-X spacing 152, a Delta-Y CMP-Y spacing 154, and a Delta-Offset offset spacing 156. Within each voxel 150, statistical analysis can be performed on data assigned to that voxel to determine, for example, multimodal distributions of traces attributes such as travel times and derive robust estimates (according to mean, median, mode, standard deviation, kurtosis, and other suitable statistical accuracy analytical measures) related to azimuthal sectors allocated to the voxel 150.

Figure 3:
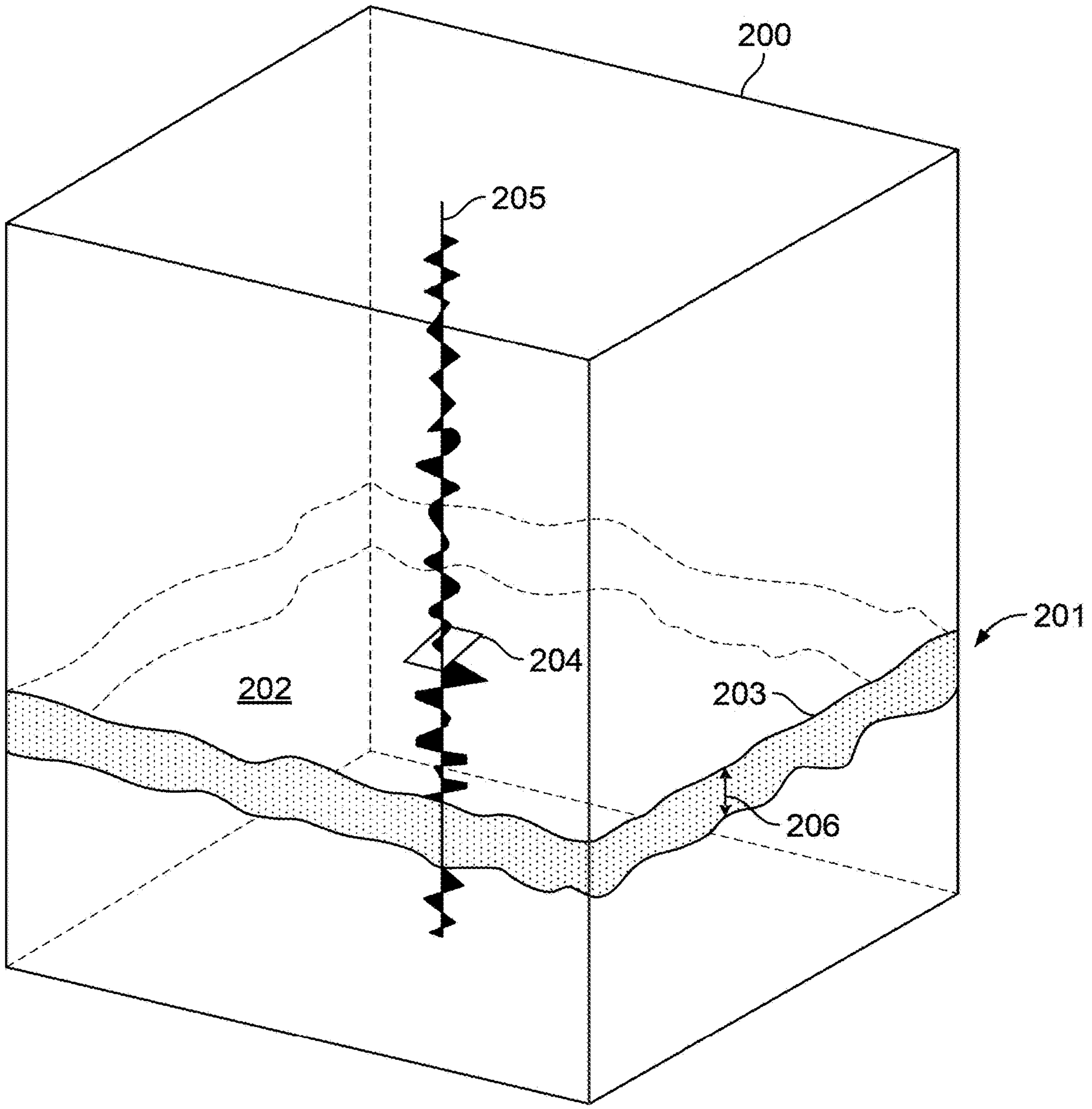
FIG. 3 illustrates a stratigraphic trace within a formation.

FIG. 3 illustrates a seismic cube 200 representing a formation. The seismic cube has a stratum 201 based on a surface (for example, amplitude surface 202) and a stratigraphic horizon 203. The amplitude surface 202 and the stratigraphic horizon 203 are grids that include many cells such as exemplary cell 204. Each cell is a seismic trace representing an acoustic wave. Each seismic trace has an x-coordinate and a y-coordinate, and each data point of the trace corresponds to a certain seismic travel time or depth (t or z). For the stratigraphic horizon 203, a time value is determined and then assigned to the cells from the stratum 201. For the amplitude surface 202, the amplitude value of the seismic trace at the time of the corresponding horizon is assigned to the cell. This assignment process is repeated for all of the cells on this horizon to generate the amplitude surface 202 for the stratum 201. In some instances, the amplitude values of the seismic trace 205 within window 206 by horizon 203 are combined to generate a compound amplitude value for stratum 201. In these instances, the compound amplitude value can be the arithmetic mean of the positive amplitudes within the duration of the window, multiplied by the number of seismic samples in the window.

Figure 4C:
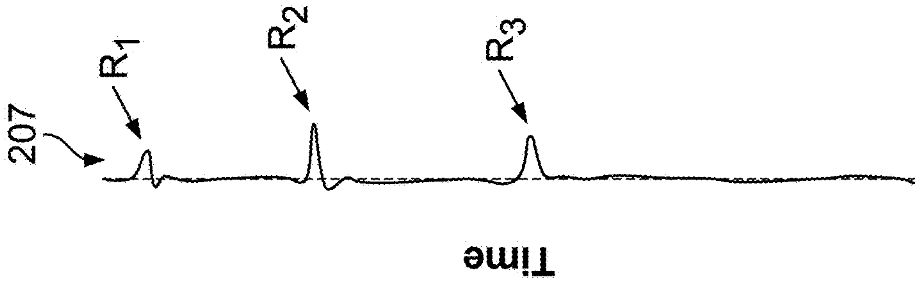
FIGS. 4A-4C illustrate the process of stacking a group of seismic traces to improve the signal to noise ratio of the traces.
Figure 4B:
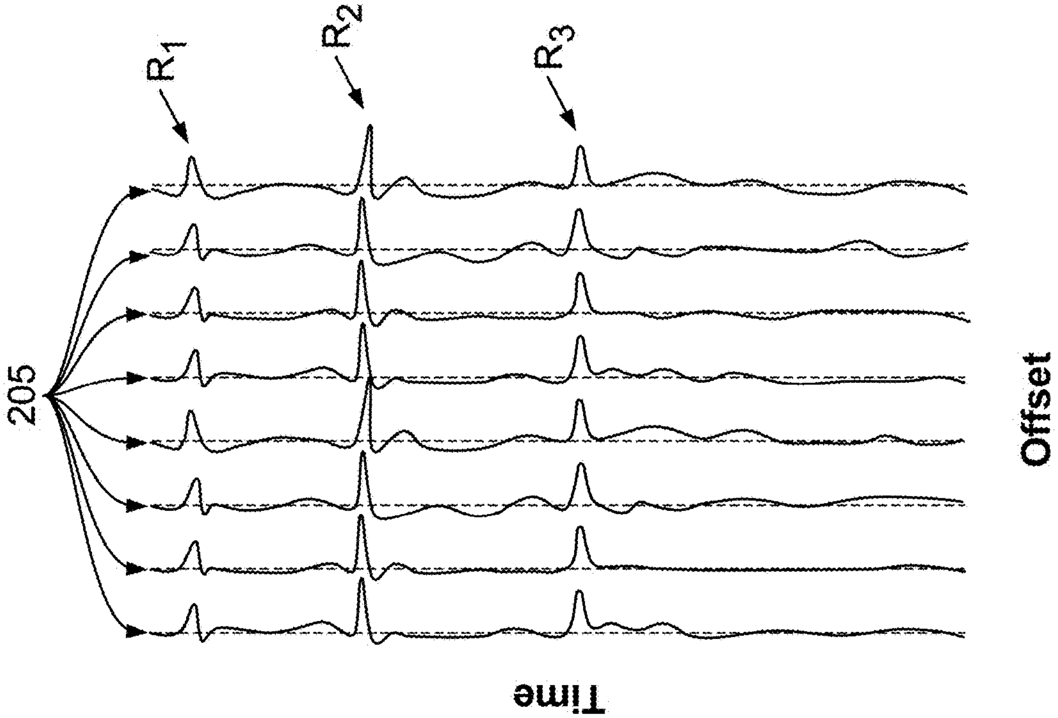
Figure 4A:
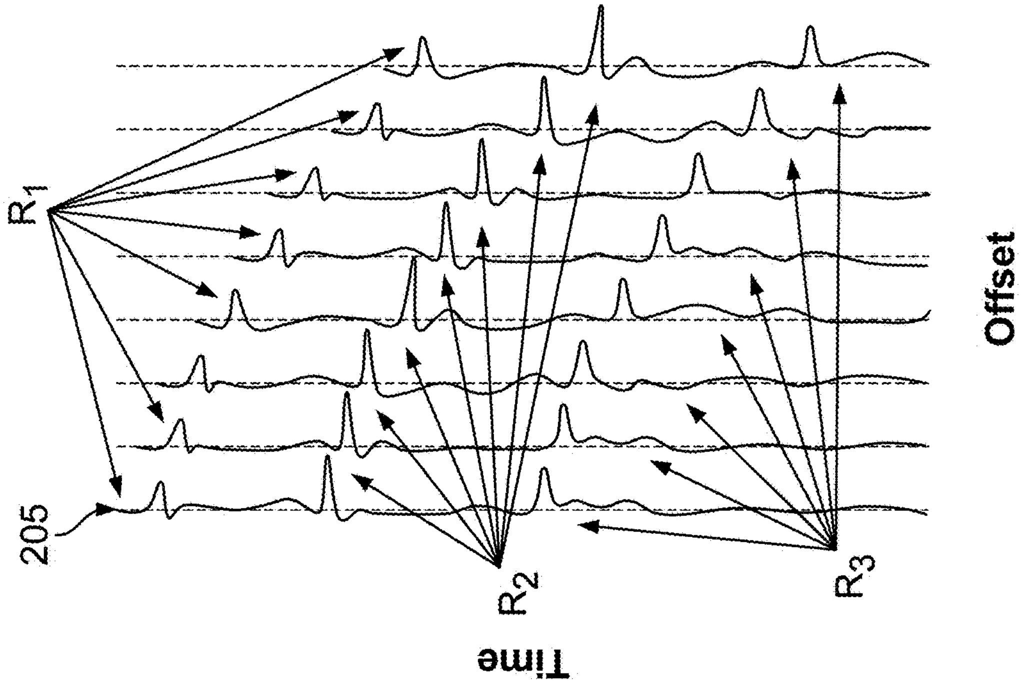

FIGS. 4A, 4B, and 4C schematically illustrate the process of stacking a group of seismic traces 205 to improve the signal to noise ratio of the traces. FIG. 4A illustrates a common midpoint (CMP) gather of eight traces 205 generated by a set of sources and sensors that share a common midpoint. For ease of explanation, the traces are assumed to have been generated by reflections from three horizontal horizons.

The traces 205 are arranged with increasing offset from the CMP. The offset of the traces 205 from the CMP increases from left to right and the reflection time increases from top to bottom. Increasing offset from the common midpoint increases the angle of a seismic wave between a source and a sensor, which increases the distance the wave travels between the source and the sensor and increases the slant reflection time. The increasing time for the reflections ($R_1$, $R_2$, $R_3$) from each of the horizons to arrive for source-sensor pairs with increasing offsets from the CMP reflects this increased slant time.

FIG. 4B shows the traces 205 after normal moveout (NMO) correction. NMO is the difference between vertical reflection time and the slant reflection time for a given source-sensor pair. This correction places reflections ($R_1$, $R_2$, $R_3$) from common horizons at the same arrival time. The NMO correction is a function of the vertical reflection time for a specific horizon, the offset for a specific source-sensor pair, and the velocity of the seismic wave in the subsurface formation. The vertical reflection time for a specific horizon and the offset for a specific source-sensor pair are known parameters for each trace. However, the velocity is usually not readily available. As previously discussed, the velocity of seismic waves depends on properties such as, for example, density, porosity, and fluid content of the medium through which the seismic waves are traveling and consequently varies with location in the subsurface formation being studied.

FIG. 4C shows a stack trace 207 generated by summing the traces 205 of the CMP gather and dividing the resulting amplitudes by the number of traces in the gather. The number of traces in the gather is also referred to as the fold of the gather. The noise tends to be cancelled out and the reflections ($R_1$, $R_2$, $R_3$) from the horizons of the subsurface formation are enhanced.

Figure 5:
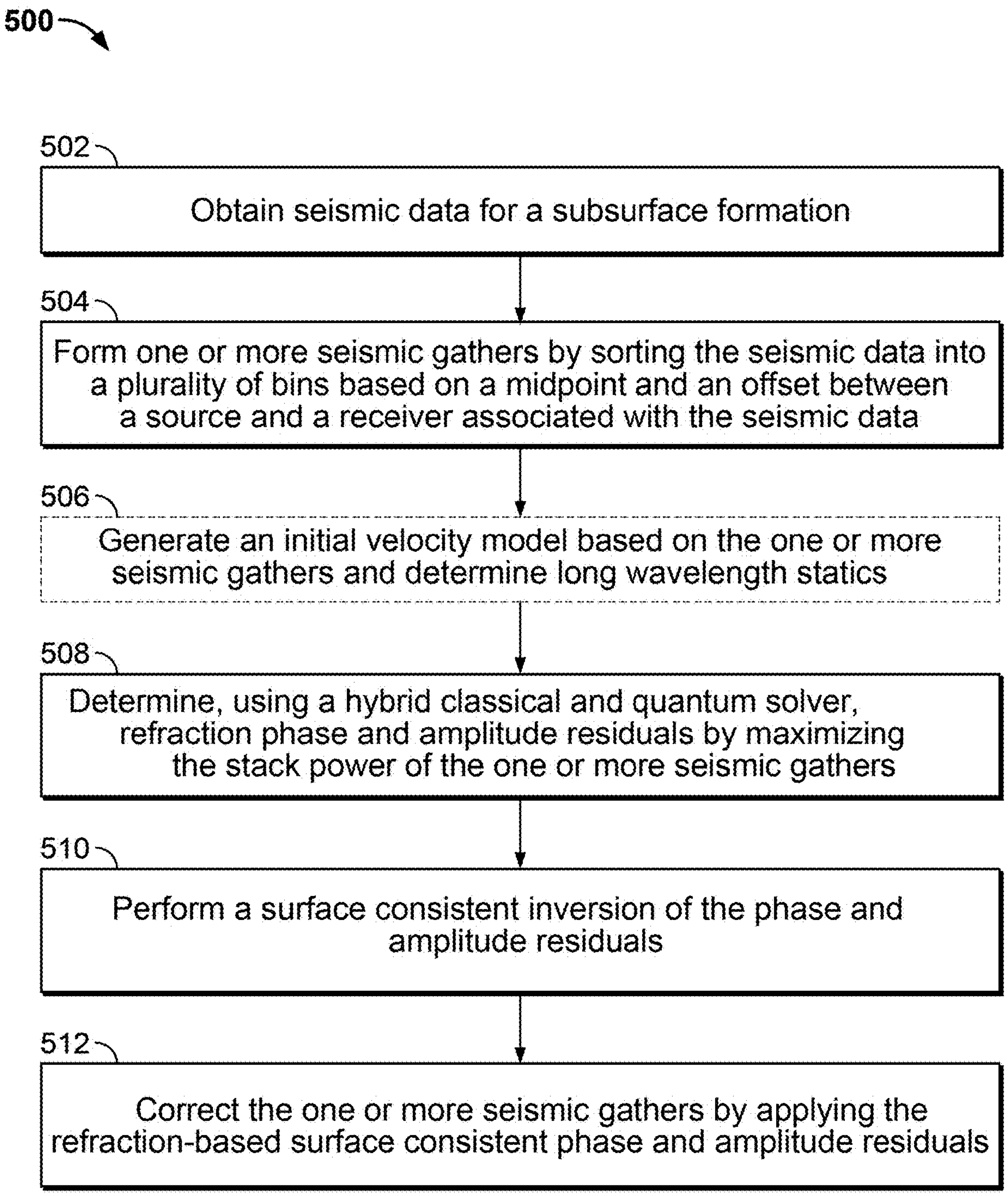
FIG. 5 is a flowchart of a method for quantum-assisted near surface analysis of seismic data.

FIG. 5 is a flowchart of an example method 500 for quantum-assisted near surface analysis of seismic data. The method 500 can be implemented on a data processing system (e.g., a computer or a control system) in conjunction with a hybrid classical and quantum solver. The quantum solver is a quantum annealing machine that uses qubits. A qubit, for example, is a physical device capable of being in an analog superposition of two bits. The quantum annealing machine can solve optimization problems that are mapped into a Binary Quadratic Model (BQM), which describes the energies of and the interactions between the qubits.

The data processing system obtains seismic data for a subsurface formation (step 502). For example, the data processing system can acquire seismic data through a seismic survey such as the seismic survey of FIG. 1. In some implementations, the data processing system accesses seismic data from a database or a data store.

The data processing system forms one or more seismic gathers by sorting the seismic data into multiple bins based on a midpoint and an offset between a source and a receiver associated with the seismic data (step 504). For example, the data processing system sorts the seismic data into CMP-X, CMP-Y and Offset (XYO) bins. In some implementations, the data processing system performs statistical analyses of the first-break picks of each XYO gather to identify and reject outliers and to derive mean travel-times for each bin. For example, if the first-break pick within a bin is more than 3 times the standard deviation travel-time for the bin from the mean travel-time for the bin, then the first break pick can be identified as an outlier and removed from the data set. Other statistical quantities (e.g., robust standard deviation) can also be used for detecting outliers.

The data processing system generates an initial velocity model based on the one or more seismic gathers and determines long wavelength statics (step 506). For example, the data processing system derives a time-offset distribution for each CMP that is fitted with a constrained spline function and converted into a layered velocity profile. Alternatively, the data processing system can directly invert the time-offset distribution to obtain a layered velocity profile. The CMP profiles can be interpolated to obtain a 3D velocity model used for evaluating phase corrections for long wavelength statics. The initial velocity model is typically good enough for providing long wavelength statics. In some implementations, the data processing system uses the initial velocity model as a starting model for other velocity model building tools such as tomography, full waveform inversion (FWI) or joint inversion.

The data processing system and a hybrid classical and quantum solver determine refraction phase and amplitude residuals for the one or more seismic gathers (e.g., XYO gathers) using stack power maximization (step 508). The phase and amplitude residuals represent relative delays and amplitude distortions of seismic events traveling through near surface anomalies as compared with seismic events not traveling through such anomalies. Stack power maximization is a process for aligning seismic traces in a seismic gather (e.g., seismic traces 205) by maximizing the magnitude of the sum of the squared amplitudes of each trace. Stack power maximization is a global optimization problem where the global maximum of the objective function can be difficult to find because the objective function can be very complex and highly multi-modal. QA can be successful in situations where other advanced global optimization techniques (e.g., simulated annealing, genetic algorithms, etc.) may fail. QA uses quantum superposition and tunneling effects to explore the solution space. On difficult optimization problems, experiments have shown that QA can be quadratically faster than other meta-heuristic optimization algorithms such as thermal annealing. This quadratic speed up is measured in terms of the rate of convergence to the solution. For example, if it takes a thermal annealer a million computational steps to find a solution, a quantum annealer may need only a thousand computational steps. In absolute terms, however, the difference can be even larger. This is because the thermal annealing algorithm needs to be simulated and each computational step takes a fraction of a second, whereas the quantum annealer does not simulate the annealing process and execution takes microseconds instead. In some cases, a million fold acceleration can be achieved using QA for difficult problems that can fit on a state of the art quantum computer. Further, using QA to solve a global optimization problem avoids problems such as cycle-skipping where non-corresponding peaks are matched (e.g., in a cross-correlation algorithm).

In some implementations, the hybrid classical quantum solver outputs identical stack-power solutions which differ by an overall shift. To solve this potential problem, the data processing system can align different XYO bins relative to each other by fixing the overall shift with the pilot trace for each bin.

The stack power maximization of M traces $d_i$ (with $i=1, \ldots, M$), shifted in time of $\tau_i$, in a XYO gather corresponds to the solution of the problem:

$$\underset{\tau}{\text{argmax}} \left\| \sum_{i=1}^{M} d_i(t-\tau_i) \right\|_2^2, \quad (1)$$

where $\tau$ is a vector containing variables $\tau_i$ which corresponds to the following DQM:

$$\underset{y \in \{1,\ldots,K\}^M}{\text{argmax}} \sum_{i=1}^{M} \sum_{j=i+1}^{M} \sum_{a=1}^{K} \sum_{b=1}^{K} \delta_{y_i a} \delta_{y_j b} I_{ijab}, \quad (2)$$

with $\delta_{yia}$ and $\delta_{yjb}$ denoting the Kronecker delta functions representing discrete variables $y_i$ used to control the application of the time shifts $t_a$ and $t_b$ to the $i^{th}$ and $j^{th}$ traces from one of the K possible shifts in the solution space $S_K=\{t_1, \ldots, t_K\}^M$ and $I_{ijab}$ representing the frequency domain inner product between the frequency spectra of the $i^{th}$ and the $j^{th}$ traces shifted by $t_a$ and $t_b$ in the time domain, respectively.

The DQM of equation (2) is converted into a BQM by encoding the discrete variables $y_i$ in terms of binary variables $x_i$, so that the solutions can be obtained using a quantum machine. In practice, using either one-hot or standard binary encodings, only problems where M×K is smaller than about a hundred can be reliably solved by a current state of the art quantum annealer. Therefore, the hybrid classical and quantum solver is used to solve the DQM. The classical portion of the algorithm defines different solution subspaces by randomly picking two time shifts from the set of possible time shifts $S_k$. The classical portion of the solver assigns the two picked time shifts to a qubit of the quantum portion in a ground state or an excited state. The classical portion of the solver also precomputes the BQM for the two picked time shifts and sends the precomputed BQM to the quantum portion (the quantum annealer). After a first iteration, the classical portion of the solver assigns the time shifts from the best result of the previous iteration to the ground states of qubits and randomly selects new time shifts for each trace from the solution space for the excited state of each qubit. The classical portion recomputes the BQM and sends precomputed BQM to the quantum portion of the solver.

For each solution subspace, the quantum portion of the solver is called to provide a result. The maximum stack power for the solution subspace corresponds to the lowest energy state of the quantum annealer. The data processing system selects the best result from among the tested solution subspaces as the final global maximum. In some implementations, a fixed number of iterations (e.g., solution subspaces) are performed. In some implementations, another stopping criterion can be used to stop iterations of the hybrid classical and quantum solver. For example, iterations can be stopped when the reduction in energy between subsequent iterations is below a threshold value.

The data processing system performs refraction-based surface consistent inversion of amplitude and phase residuals (step 510). The inversion projects the phase and amplitude distortions estimated from the seismic traces to the phase and amplitude distortions at the source and receiver positions. These distortions can be visualized in maps that characterize the shallow subsurface anomalies (e.g., FIGS. 9 and 10).

The data processing system corrects one or more seismic gathers by applying the refraction-based surface consistent phase and amplitude residuals (step 512). The data processing system adds the phase residuals, also called short wavelength statics, to the long wavelength statics previously calculated to give the total refraction statics. The data processing system can then apply the total refraction statics to the seismic traces (e.g., gathers). This operation corresponds to a shift of the traces by an amount of time equal to the total refraction statics. The data processing system can perform spherical divergence compensation on the amplitude of the seismic traces and correct the amplitude residuals through amplitude balancing or frequency-dependent deconvolution operations. The balancing operation corresponds to a division of the seismic traces by a value obtained from the amplitude residuals. The deconvolution operation includes a division in the frequency domain of the seismic traces spectrum by a deconvolution operator obtained from the frequency-dependent amplitude residuals.

An example implementation of the method 500 was conducted to assess the accuracy and robustness of the method. Synthetic data was extracted from a significant portion of the SEAM Arid model dataset, representing a realistic description of the complex geological features (e.g., karsts, wadis, paleo-channels, etc.) of the subsurface in desert environments (Michael Oristaglio, (2015), "SEAM Update," The Leading Edge 34:466, 468, hereby incorporated by reference in its entirety).

Figure 6B:
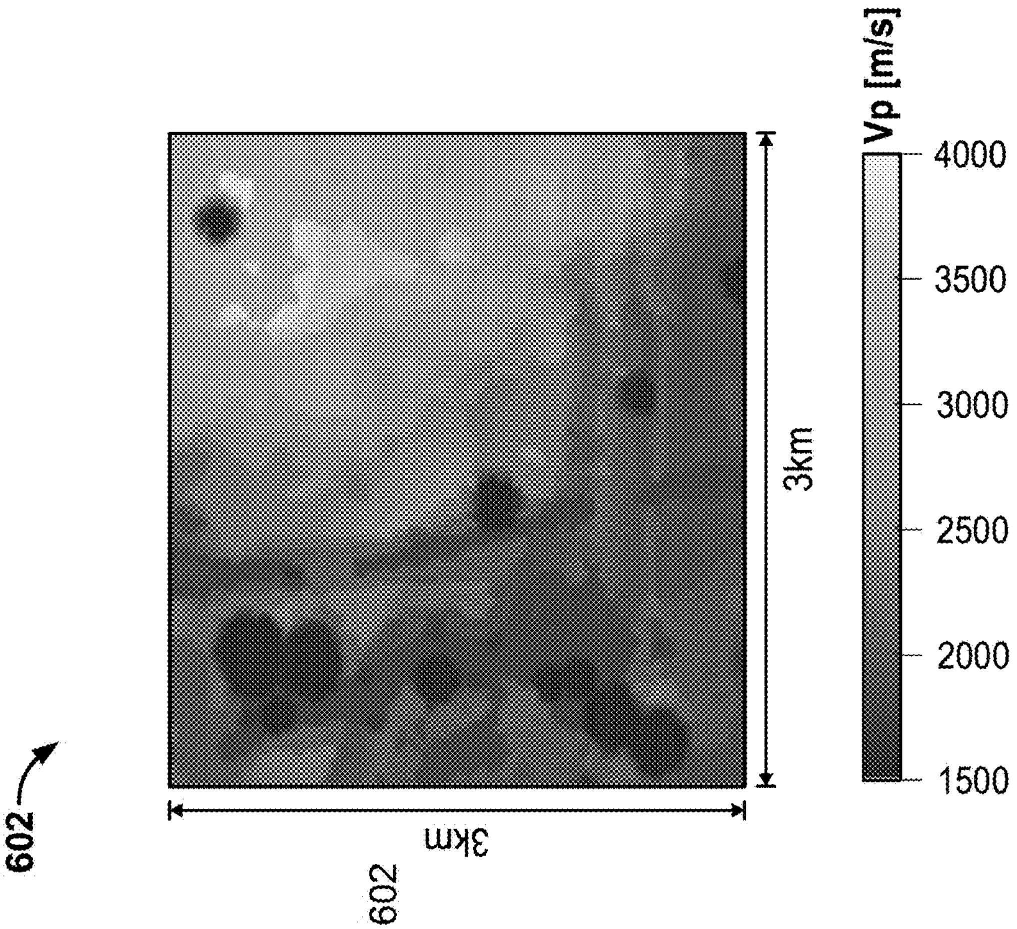
FIG. 6B shows a zoomed in area of the average compressional velocity model of FIG. 6A.
Figure 6A:
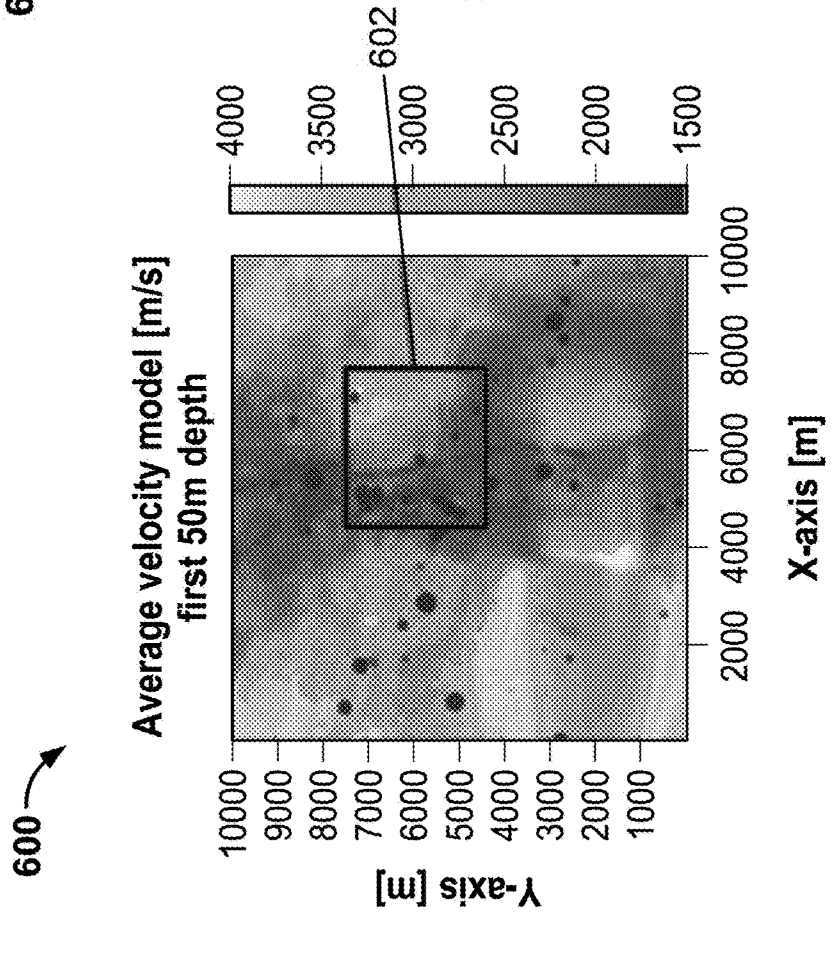
FIG. 6A shows an average compressional velocity model.

FIG. 6A shows a map 600 of the first 50 m depth average compressional wave velocities for the full model (10 km×10 km) and for the Area of Interest 602, AOI (3 km×3 km). FIG. 6B shows a zoomed in map of the AOI 602. In this example, about M=50 traces per bin have been used and the number of allowed trace discrete time shifts has been set to K=7 (time shifts from 0ms to 36 ms, being dt=6 ms), corresponding to $7^{50}$ possible configurations per bin. About 2,100 XYO gathers have been processed in total.

Figure 7A:
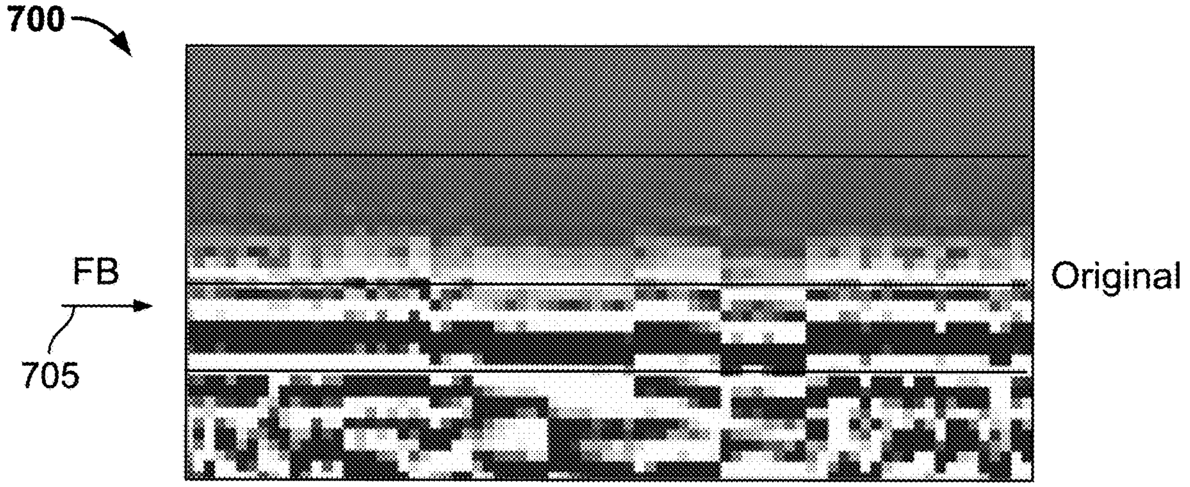
FIGS. 7A-7C show seismic trace alignment for a seismic gather for original data, cross-correlation alignment, and quantum-assisted alignment.
Figure 7B:
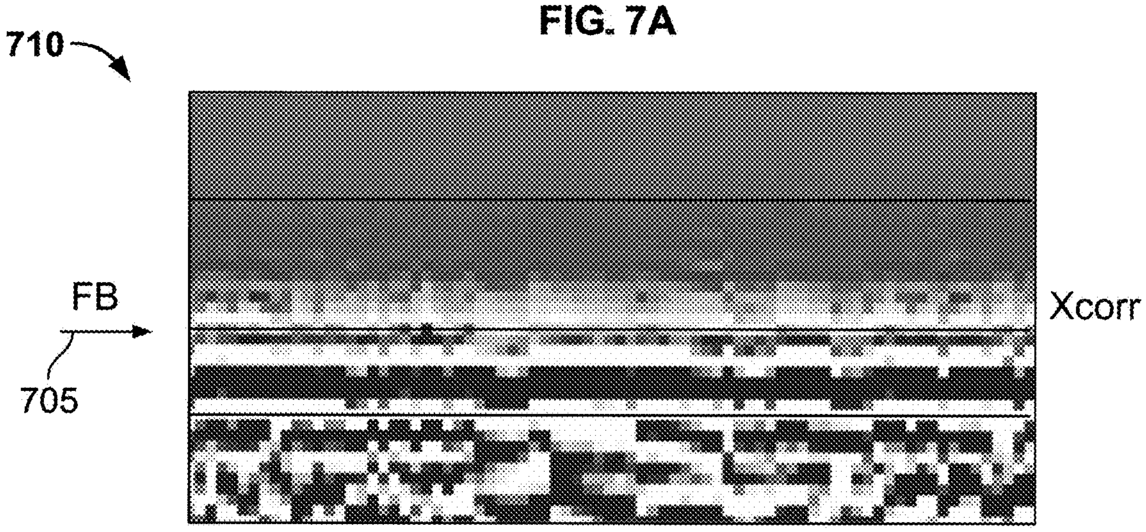
Figure 7C:
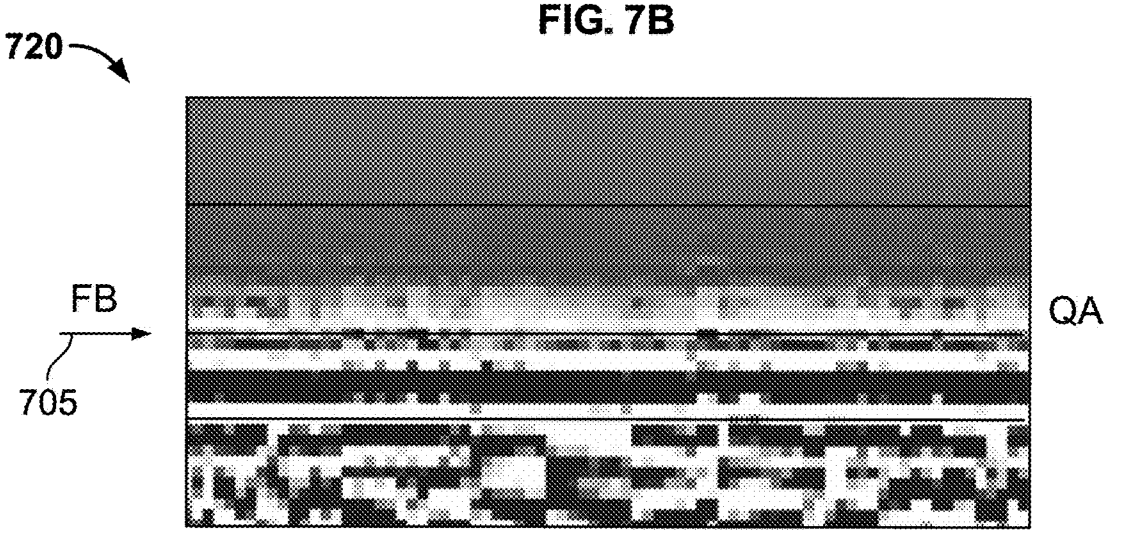

FIG. 7A shows an original XYO gather 700. FIG. 7B shows a cross-correlation (XCORR) alignment 710 of the XYO gather 700 as a benchmark comparison. FIG. 7C shows the QA global optimization of the stack-power alignment 720 of the XYO gather 700 from an implementation of the method 500. A processing window of 120 ms around the first break arrival 705 has been chosen for both the XCORR 710 and the QA 720 approaches. In this example, the stack-power improved by 75% using QA and by 50% using the XCORR as compared with the original gather.

Figure 8A:
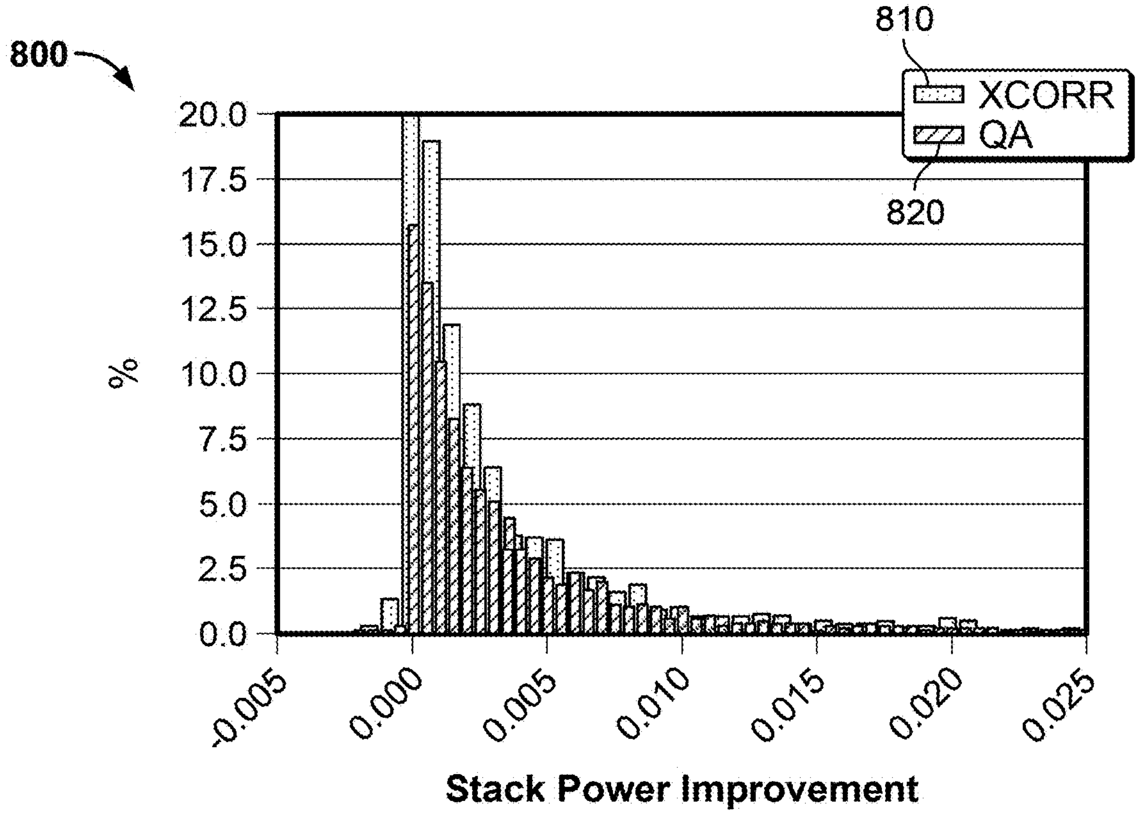
FIGS. 8A-8B show stack power improvements using cross-correlation and quantum-assisted techniques.

FIG. 8A shows histograms of the stack power improvement using XCORR 810 and QA 820. The stack power improvement is determined as the stack power of the seismic traces after alignment by the XCORR or QA methods minus the stack power of the original traces. In the AOI 602, the relative mean improvements of the stack-power are 39% and 43% for the conventional cross correlation (XCORR) and quantum assisted method, respectively. In general, QA 820 shows a higher stack power than XCORR 810 as shown by the higher probabilities for QA 820 at larger values of stack power improvements as compared with XCORR 810. Higher stack power corresponds to better alignment of the seismic data, better estimation of phase and amplitude residuals, and increased accuracy in the characterization of the shallow subsurface anomalies.

Figure 8B:
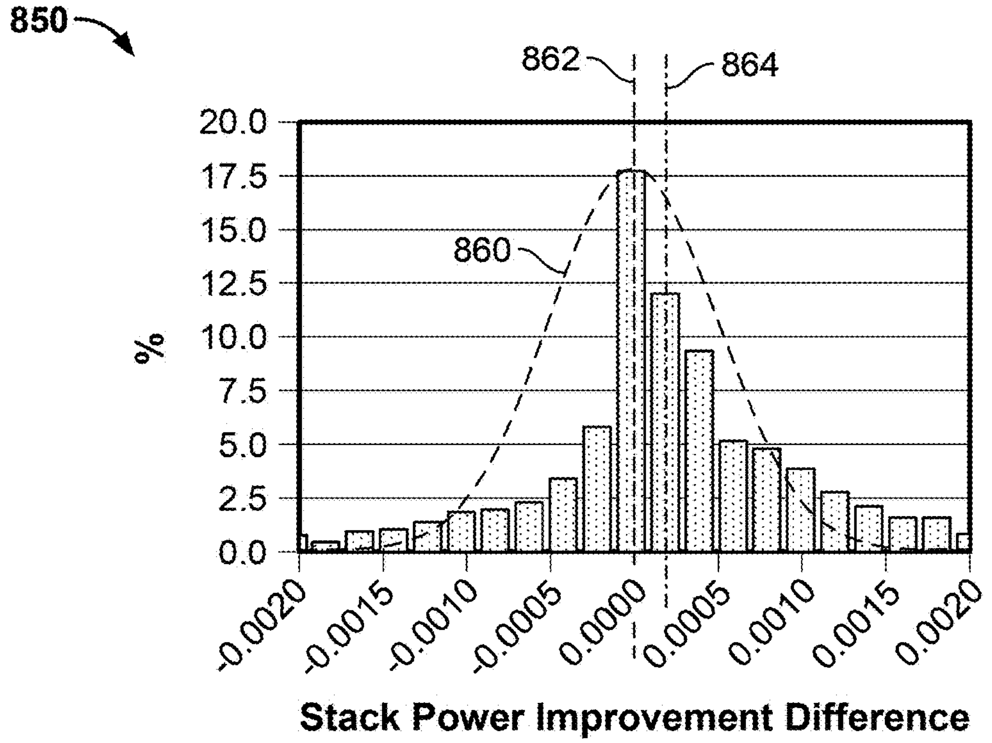

FIG. 8B shows a histogram 850 of the difference in the stack power improvements from QA and XCORR. The histogram 850 represents the differences between the QA 820 and XCORR 810 data shown in FIG. 8A. The continuous line 860 shows a Gaussian distribution fitting the data with a zero-mean 862. The distribution of the histogram is clearly shifted to the right with the mean shown by line 864. The shifted mean represents the overall improvement in the stack power by the QA solution versus the XCORR solution.

Figure 9A:
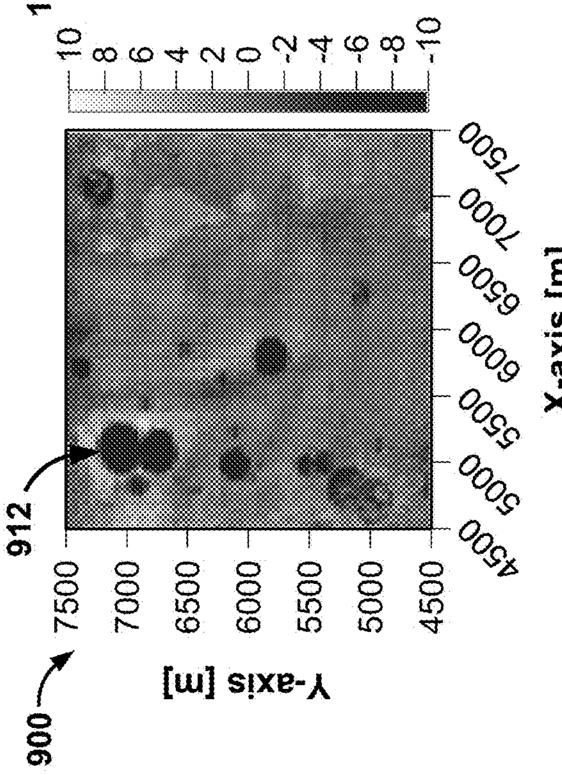
FIGS. 9A-9B illustrate estimated phase residuals for the area of interest shown in FIG. 6B using cross correlation and quantum assisted techniques.
Figure 9B:
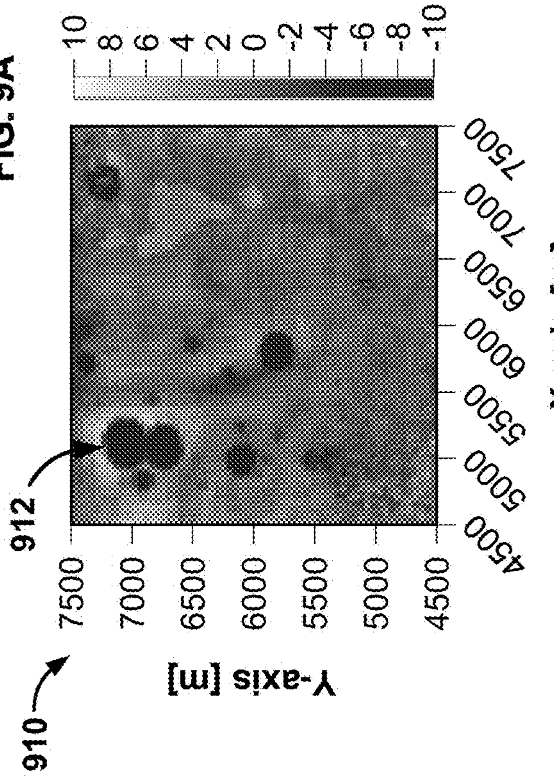

FIGS. 9A-9B show the phase residual maps determined by XCORR 900 and QA 910 approaches. The solutions are generally comparable. The main geological structures (e.g., karsts 912) are well defined in both the solutions. The value of the residuals (as denoted by the colorscale) are comparable between the approaches.

Figure 10A:
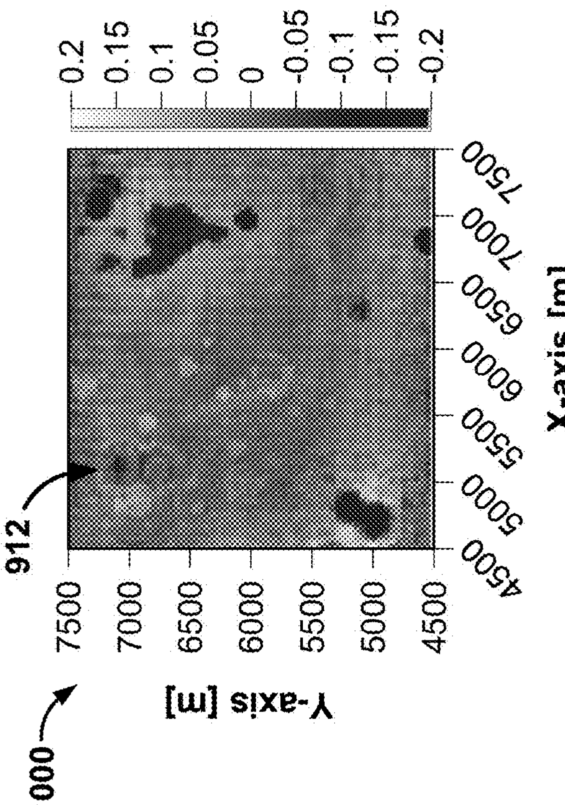
FIGS. 10A-10B illustrate estimated amplitude residuals for the area of interest shown in FIG. 6B using cross correlation and quantum assisted techniques.
Figure 10B:
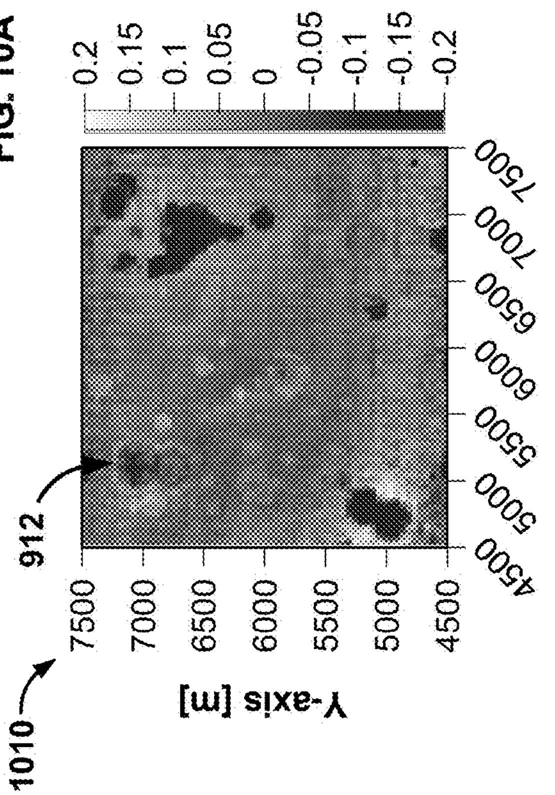

FIGS. 10A-10B show the amplitude residual maps determined by XCORR 1000 and QA 1010 approaches. Here the solutions are also generally consistent with each other. The main geological structures (e.g., karsts 912) are well defined in both the solutions. The value of the residuals (as denoted by the colorscale) are comparable between the approaches.

Figure 11:
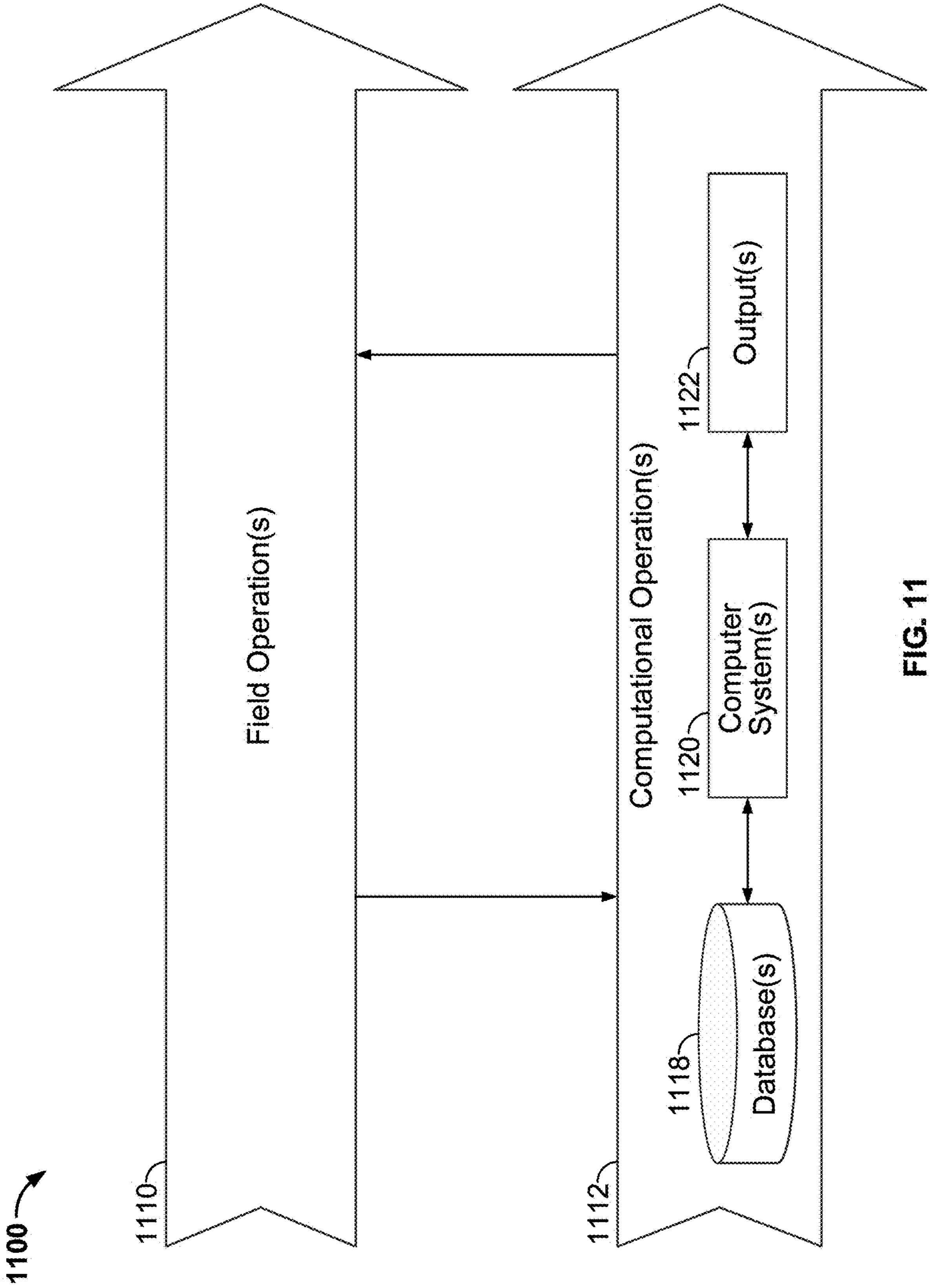
FIG. 11 illustrates hydrocarbon production operations that include field operations and computational operations, according to some implementations.

FIG. 11 illustrates hydrocarbon production operations 1100 that include both one or more field operations 1110 and one or more computational operations 1112, which exchange information and control exploration for the production of hydrocarbons. In some implementations, outputs of techniques of the present disclosure (e.g., the method 500) can be performed before, during, or in combination with the hydrocarbon production operations 1100, specifically, for example, either as field operations 1110 or computational operations 1112, or both.

Examples of field operations 1110 include forming/drilling a wellbore, hydraulic fracturing, producing through the wellbore, injecting fluids (such as water) through the wellbore, to name a few. In some implementations, methods of the present disclosure can trigger or control the field operations 1110. For example, the methods of the present disclosure can generate data from hardware/software including sensors and physical data gathering equipment (e.g., seismic sensors, well logging tools, flow meters, and temperature and pressure sensors). The methods of the present disclosure can include transmitting the data from the hardware/software to the field operations 1110 and responsively triggering the field operations 1110 including, for example, generating plans and signals that provide feedback to and control physical components of the field operations 1110. Alternatively, or in addition, the field operations 1110 can trigger the methods of the present disclosure. For example, implementing physical components (including, for example, hardware, such as sensors) deployed in the field operations 1110 can generate plans and signals that can be provided as input or feedback (or both) to the methods of the present disclosure.

Examples of computational operations 1112 include one or more computer systems 1120 that include one or more processors and computer-readable media (e.g., non-transitory computer-readable media) operatively coupled to the one or more processors to execute computer operations to perform the methods of the present disclosure. The computational operations 1112 can be implemented using one or more databases 1118, which store data received from the field operations 1110 and/or generated internally within the computational operations 1112 (e.g., by implementing the methods of the present disclosure) or both. For example, the one or more computer systems 1120 process inputs from the field operations 1110 to assess conditions in the physical world, the outputs of which are stored in the databases 1118. For example, seismic sensors of the field operations 1110 can be used to perform a seismic survey to map subterranean features, such as facies and faults. In performing a seismic survey, seismic sources (e.g., seismic vibrators or explosions) generate seismic waves that propagate in the earth and seismic receivers (e.g., geophones) measure reflections generated as the seismic waves interact with boundaries between layers of a subsurface formation. The source and received signals are provided to the computational operations 1112 where they are stored in the databases 1118 and analyzed by the one or more computer systems 1120.

In some implementations, one or more outputs 1122 generated by the one or more computer systems 1120 can be provided as feedback/input to the field operations 1110 (either as direct input or stored in the databases 1118). The field operations 1110 can use the feedback/input to control physical components used to perform the field operations 1110 in the real world.

For example, the computational operations 1112 can process the seismic data to generate three-dimensional (3D) maps of the subsurface formation. The computational operations 1112 can use these 3D maps to provide plans for locating and drilling exploratory wells. In some operations, the exploratory wells are drilled using logging-while-drilling (LWD) techniques which incorporate logging tools into the drill string. LWD techniques can enable the computational operations 1112 to process new information about the formation and control the drilling to adjust to the observed conditions in real-time.

The one or more computer systems 1120 can update the 3D maps of the subsurface formation as information from one exploration well is received and the computational operations 1112 can adjust the location of the next exploration well based on the updated 3D maps. Similarly, the data received from production operations can be used by the computational operations 1112 to control components of the production operations. For example, production well and pipeline data can be analyzed to predict slugging in pipelines leading to a refinery and the computational operations 1112 can control machine operated valves upstream of the refinery to reduce the likelihood of plant disruptions that run the risk of taking the plant offline.

In some implementations of the computational operations 1112, customized user interfaces can present intermediate or final results of the above-described processes to a user. Information can be presented in one or more textual, tabular, or graphical formats, such as through a dashboard. The information can be presented at one or more on-site locations (such as at an oil well or other facility), on the Internet (such as on a webpage), on a mobile application (or app), or at a central processing facility.

The presented information can include feedback, such as changes in parameters or processing inputs, that the user can select to improve a production environment, such as in the exploration, production, and/or testing of petrochemical processes or facilities. For example, the feedback can include parameters that, when selected by the user, can cause a change to, or an improvement in, drilling parameters (including drill bit speed and direction) or overall production of a gas or oil well. The feedback, when implemented by the user, can improve the speed and accuracy of calculations, streamline processes, improve models, and solve problems related to efficiency, performance, safety, reliability, costs, downtime, and the need for human interaction.

In some implementations, the feedback can be implemented in real-time, such as to provide an immediate or near-immediate change in operations or in a model. The term real-time (or similar terms as understood by one of ordinary skill in the art) means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

Events can include readings or measurements captured by downhole equipment such as sensors, pumps, bottom hole assemblies, or other equipment. The readings or measurements can be analyzed at the surface, such as by using applications that can include modeling applications and machine learning. The analysis can be used to generate changes to settings of downhole equipment, such as drilling equipment. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart or are located in different countries or other jurisdictions.

Figure 12:
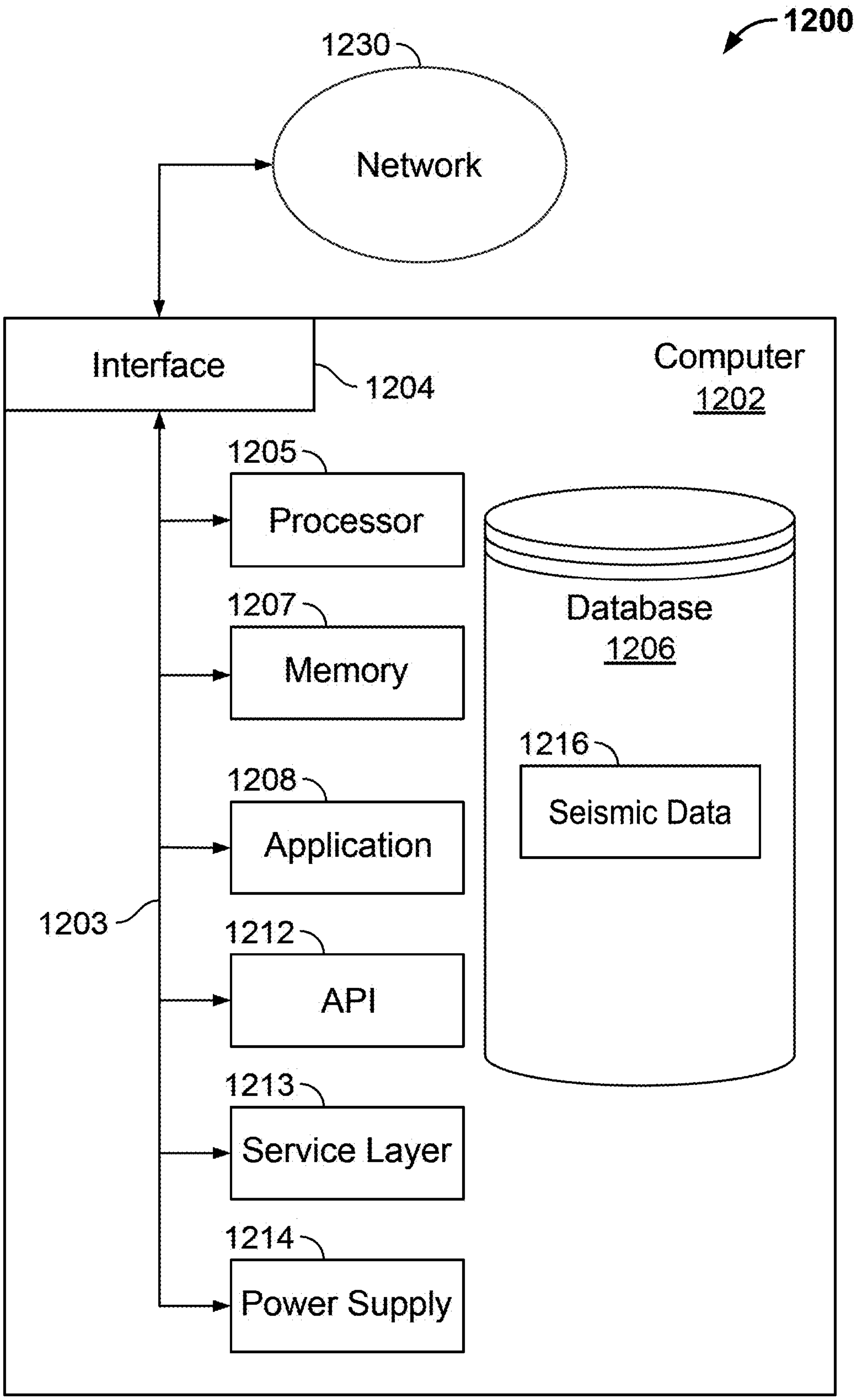
FIG. 12 is a block diagram illustrating an example computer system used to provide computational functionalities associated with described algorithms, methods, functions, processes, flows, and procedures according to some implementations of the present disclosure.

FIG. 12 is a block diagram of an example computer system 1200 used to provide computational functionalities associated with described algorithms, methods, functions, processes, flows, and procedures described in the present disclosure, according to some implementations of the present disclosure. The illustrated computer 1202 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1202 can include input devices such as keypads, keyboards, and touch screens that can accept user information. Also, the computer 1202 can include output devices that can convey information associated with the operation of the computer 1202. The information can include digital data, visual data, audio information, or a combination of information. The information can be presented in a graphical user interface (UI) (or GUI).

The computer 1202 can serve in a role as a client, a network component, a server, a database, a persistency, or components of a computer system for performing the subject matter described in the present disclosure. The illustrated computer 1202 is communicably coupled with a network 1230. In some implementations, one or more components of the computer 1202 can be configured to operate within different environments, including cloud-computing-based environments, local environments, global environments, and combinations of environments.

At a high level, the computer 1202 is an electronic computing device operable to receive, transmit, process, store, and manage data and information associated with the described subject matter. According to some implementations, the computer 1202 can also include, or be communicably coupled with, an application server, an email server, a web server, a caching server, a streaming data server, or a combination of servers.

The computer 1202 can receive requests over network 1230 from a client application (for example, executing on another computer 1202). The computer 1202 can respond to the received requests by processing the received requests using software applications. Requests can also be sent to the computer 1202 from internal users (for example, from a command console), external (or third) parties, automated applications, entities, individuals, systems, and computers.

Each of the components of the computer 1202 can communicate using a system bus 1203. In some implementations, any or all of the components of the computer 1202, including hardware or software components, can interface with each other or the interface 1204 (or a combination of both), over the system bus 1203. Interfaces can use an application programming interface (API) 1212, a service layer 1213, or a combination of the API 1212 and service layer 1213. The API 1212 can include specifications for routines, data structures, and object classes. The API 1212 can be either computer-language independent or dependent. The API 1212 can refer to a complete interface, a single function, or a set of APIs.

The service layer 1213 can provide software services to the computer 1202 and other components (whether illustrated or not) that are communicably coupled to the computer 1202. The functionality of the computer 1202 can be accessible for all service consumers using this service layer. Software services, such as those provided by the service layer 1213, can provide reusable, defined functionalities through a defined interface. For example, the interface can be software written in JAVA, C++, or a language providing data in extensible markup language (XML) format. While illustrated as an integrated component of the computer 1202, in alternative implementations, the API 1212 or the service layer 1213 can be stand-alone components in relation to other components of the computer 1202 and other components communicably coupled to the computer 1202. Moreover, any or all parts of the API 1212 or the service layer 1213 can be implemented as child or sub-modules of another software module, enterprise application, or hardware module without departing from the scope of the present disclosure.

The computer 1202 includes an interface 1204. Although illustrated as a single interface 1204 in FIG. 12, two or more interfaces 1204 can be used according to particular needs, desires, or particular implementations of the computer 1202 and the described functionality. The interface 1204 can be used by the computer 1202 for communicating with other systems that are connected to the network 1230 (whether illustrated or not) in a distributed environment. Generally, the interface 1204 can include, or be implemented using, logic encoded in software or hardware (or a combination of software and hardware) operable to communicate with the network 1230. More specifically, the interface 1204 can include software supporting one or more communication protocols associated with communications. As such, the network 1230 or the interface's hardware can be operable to communicate physical signals within and outside of the illustrated computer 1202.

The computer 1202 includes a processor 1205. Although illustrated as a single processor 1205 in FIG. 12, two or more processors 1205 can be used according to particular needs, desires, or particular implementations of the computer 1202 and the described functionality. Generally, the processor 1205 can execute instructions and can manipulate data to perform the operations of the computer 1202, including operations using algorithms, methods, functions, processes, flows, and procedures as described in the present disclosure.

The computer 1202 also includes a database 1206 that can hold data for the computer 1202 and other components connected to the network 1230 (whether illustrated or not). For example, database 1206 can hold seismic data 1216. For example, database 1206 can be an in-memory, conventional, or a database storing data consistent with the present disclosure. In some implementations, database 1206 can be a combination of two or more different database types (for example, hybrid in-memory and conventional databases) according to particular needs, desires, or particular implementations of the computer 1202 and the described functionality. Although illustrated as a single database 1206 in FIG. 12, two or more databases (of the same, different, or combination of types) can be used according to particular needs, desires, or particular implementations of the computer 1202 and the described functionality. While database 1206 is illustrated as an internal component of the computer 1202, in alternative implementations, database 1206 can be external to the computer 1202.

The computer 1202 also includes a memory 1207 that can hold data for the computer 1202 or a combination of components connected to the network 1230 (whether illustrated or not). Memory 1207 can store any data consistent with the present disclosure. In some implementations, memory 1207 can be a combination of two or more different types of memory (for example, a combination of semiconductor and magnetic storage) according to particular needs, desires, or particular implementations of the computer 1202 and the described functionality. Although illustrated as a single memory 1207 in FIG. 12, two or more memories 1207 (of the same, different, or combination of types) can be used according to particular needs, desires, or particular implementations of the computer 1202 and the described functionality. While memory 1207 is illustrated as an internal component of the computer 1202, in alternative implementations, memory 1207 can be external to the computer 1202.

The application 1208 can be an algorithmic software engine providing functionality according to particular needs, desires, or particular implementations of the computer 1202 and the described functionality. For example, application 1208 can serve as one or more components, modules, or applications. Further, although illustrated as a single application 1208, the application 1208 can be implemented as multiple applications 1208 on the computer 1202. In addition, although illustrated as internal to the computer 1202, in alternative implementations, the application 1208 can be external to the computer 1202.

The computer 1202 can also include a power supply 1214. The power supply 1214 can include a rechargeable or non-rechargeable battery that can be configured to be either user- or non-user-replaceable. In some implementations, the power supply 1214 can include power-conversion and management circuits, including recharging, standby, and power management functionalities. In some implementations, the power-supply 1214 can include a power plug to allow the computer 1202 to be plugged into a wall socket or a power source to, for example, power the computer 1202 or recharge a rechargeable battery.

There can be any number of computers 1202 associated with, or external to, a computer system containing computer 1202, with each computer 1202 communicating over network 1230. Further, the terms "client," "user," and other appropriate terminology can be used interchangeably, as appropriate, without departing from the scope of the present disclosure. Moreover, the present disclosure contemplates that many users can use one computer 1202 and one user can use multiple computers 1202.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of implementations of these systems and methods have been described. Nevertheless, it will be understood that various modifications may be made without departing from the spirit and scope of this disclosure. Accordingly, other implementations are within the scope of the following claims.

EXAMPLES

In an example implementation, a method for near surface analysis of seismic data includes obtaining seismic data for a subsurface formation; forming one or more seismic gathers by sorting the seismic data into a plurality of bins based on a midpoint and an offset between a source and a receiver associated with the seismic data; determining, using a hybrid classical and quantum solver, surface consistent refraction phase and amplitude residuals by maximizing the stack power of the one or more seismic gathers wherein a classical portion of the hybrid classical and quantum solver defines and partitions a stack power maximization, and a quantum portion of the hybrid classical and quantum solver finds a maximum stack power of the partitions through quantum annealing; and performing refraction-based surface consistent amplitude and phase correction to the one or more seismic gathers by applying the surface consistent refraction phase and amplitude residuals, wherein the surface consistent refraction phase and amplitude residual correction reduces distortions in the one or more seismic gathers.

An aspect combinable with the example implementation further includes controlling hydrocarbon extraction based at least in part on the corrected one or more seismic gathers.

In another aspect combinable with any of the previous aspects, determining surface consistent refraction phase and amplitude residuals includes for each seismic gather, forming a discrete quadratic model representing a stack power of the seismic gather; partitioning the stack power maximization by defining solution subspaces of the discrete quadratic model using the classical portion of the hybrid classical and quantum solver; and determining a global stack power maximum for each solution subspace using the quantum portion of the hybrid classical and quantum solver.

In another aspect combinable with any of the previous aspects, the quantum portion comprises a quantum annealer including qubits capable of being in an analog superposition of two bits.

Another aspect combinable with any of the previous aspects includes aligning seismic gathers relative to each other based on fixing an overall shift with a pilot trace for each bin of the plurality of bins.

In another aspect combinable with any of the previous aspects, performing refraction-based surface consistent amplitude and phase corrections includes determining long wavelength statics by generating an initial velocity model based on the one or more seismic gathers; determining short wavelength statics based on a surface consistent inversion of the phase and amplitude residuals; determining total refraction statics for the subsurface formation by combining the long wavelength statics and the short wavelength statics; applying the total refraction statics to the one or more seismic gathers; determining amplitude correction factors or deconvolution operators based on a surface consistent inversion of the phase and amplitude residuals; and applying the amplitude correction factors or the deconvolution operators to the one or more seismic gathers.

In another aspect combinable with any of the previous aspects, forming one or more seismic gathers includes identifying outliers in each seismic gather by performing a statistical analysis on first-break picks of each seismic gather.

In another example implementation, a system for near surface analysis of seismic data includes a hybrid classical and quantum solver; at least one processor and a memory storing instructions that when executed by the at least one processor cause the at least one processor to perform operations including obtaining seismic data for a subsurface formation; forming one or more seismic gathers by sorting the seismic data into a plurality of bins based on a midpoint and an offset between a source and a receiver associated with the seismic data; determining, using the hybrid classical and quantum solver, surface consistent refraction phase and amplitude residuals by maximizing the stack power of the one or more seismic gathers wherein a classical portion of the hybrid classical and quantum solver defines and partitions a stack power maximization and a quantum portion of the hybrid classical and quantum solver finds a maximum stack power of the partitions through quantum annealing; performing refraction-based surface consistent amplitude and phase correction to the one or more seismic gathers by applying the surface consistent refraction phase and amplitude residuals, where the surface consistent refraction phase and amplitude residual correction reduces distortions in the one or more seismic gathers.

In an aspect combinable with the example implementation, the operations further include controlling hydrocarbon extraction based at least in part on the corrected one or more seismic gathers.

In another aspect combinable with any of the previous aspects, determining surface consistent refraction phase and amplitude residuals includes for each seismic gather, forming a discrete quadratic model representing a stack power of the seismic gather; partitioning the stack power maximization by defining solution subspaces of the discrete quadratic model using the classical portion of the hybrid classical and quantum solver; and determining a global stack power maximum for each solution subspace using the quantum portion of the hybrid classical and quantum solver.

In another aspect combinable with any of the previous aspects, the quantum portion of the hybrid classical quantum solver includes a quantum annealer including qubits capable of being in an analog superposition of two bits.

In another aspect combinable with any of the previous aspects, the operations further include aligning seismic gathers relative to each other based on fixing an overall shift with a pilot trace for each bin of the plurality of bins.

In another aspect combinable with any of the previous aspects, performing refraction-based surface consistent amplitude and phase corrections includes determining long wavelength statics by generating an initial velocity model based on the one or more seismic gathers; determining short wavelength statics based on a surface consistent inversion of the phase and amplitude residuals; determining total refraction statics for the subsurface formation by combining the long wavelength statics and the short wavelength statics; and applying the total refraction statics to the one or more seismic gathers; determining amplitude correction factors or deconvolution operators based on a surface consistent inversion of the phase and amplitude residuals; and applying the amplitude correction factors or the deconvolution operators to the one or more seismic gathers.

In another aspect combinable with any of the previous aspects, forming one or more seismic gathers includes identifying outliers in each seismic gather by performing a statistical analysis on first-break picks of each seismic gather.

In another example implementation, one or more non-transitory, machine-readable storage devices storing instructions for near surface analysis of seismic data, the instructions being executable by one or more processors, to cause performance of operations including obtaining seismic data for a subsurface formation; forming one or more seismic gathers by sorting the seismic data into a plurality of bins based on a midpoint and an offset between a source and a receiver associated with the seismic data; determining, using a hybrid classical and quantum solver, surface consistent refraction phase and amplitude residuals by maximizing the stack power of the one or more seismic gathers wherein a classical portion of the hybrid classical and quantum solver defines and partitions a stack power maximization and a quantum portion of the hybrid classical and quantum solver finds a maximum stack power of the partitions through quantum annealing; performing refraction-based surface consistent amplitude and phase correction to the one or more seismic gathers by applying the surface consistent refraction phase and amplitude residuals, where the surface consistent refraction phase and amplitude residual correction reduces distortions in the one or more seismic gathers.

In an aspect combinable with the example implementation, the operations further include controlling hydrocarbon extraction based at least in part on the corrected one or more seismic gathers.

In another aspect combinable with any of the previous aspects, wherein determining surface consistent refraction phase and amplitude residuals includes for each seismic gather, forming a discrete quadratic model representing a stack power of the seismic gather; partitioning the stack power maximization by defining solution subspaces of the discrete quadratic model using the classical portion of the hybrid classical and quantum solver; and determining a global stack power maximum for each solution subspace using the quantum portion of the hybrid classical and quantum solver.

In another aspect combinable with any of the previous aspects, the quantum portion includes a quantum annealer including qubits capable of being in an analog superposition of two bits.

In another aspect combinable with any of the previous aspects, the operations further include aligning seismic gathers relative to each other based on fixing an overall shift with a pilot trace for each bin of the plurality of bins; and forming one or more seismic gathers includes identifying outliers in each seismic gather by performing a statistical analysis on first-break picks of each seismic gather.

In another aspect combinable with any of the previous aspects, performing refraction-based surface consistent amplitude and phase corrections includes determining long wavelength statics by generating an initial velocity model based on the one or more seismic gathers; determining short wavelength statics based on a surface consistent inversion of the phase and amplitude residuals; determining total refraction statics for the subsurface formation by combining the long wavelength statics and the short wavelength statics; applying the total refraction statics to the one or more seismic gathers; determining amplitude correction factors or deconvolution operators based on a surface consistent inversion of the phase and amplitude residuals; and applying the amplitude correction factors or the deconvolution operators to the one or more seismic gathers.

What is claimed is:

1. A method for near surface analysis of seismic data, the method comprising:

obtaining seismic data for a subsurface formation;

forming one or more seismic gathers by sorting the seismic data into a plurality of bins based on a midpoint and an offset between a source and a receiver associated with the seismic data;

determining, using a hybrid classical and quantum solver, surface consistent refraction phase and amplitude residuals by maximizing the stack power of the one or more seismic gathers wherein a classical portion of the hybrid classical and quantum solver defines and partitions a stack power maximization, and a quantum portion of the hybrid classical and quantum solver finds a maximum stack power of the partitions through quantum annealing; and performing refraction-based surface consistent amplitude and phase correction to the one or more seismic gathers by applying the surface consistent refraction phase and amplitude residuals, wherein the surface consistent refraction phase and amplitude residual correction reduces distortions in the one or more seismic gathers.

2. The method of claim 1, further comprising controlling hydrocarbon extraction based at least in part on the corrected one or more seismic gathers.

3. The method of claim 1, wherein determining surface consistent refraction phase and amplitude residuals comprises:

for each seismic gather, forming a discrete quadratic model representing a stack power of the seismic gather;

partitioning the stack power maximization by defining solution subspaces of the discrete quadratic model using the classical portion of the hybrid classical and quantum solver; and determining a global stack power maximum for each solution subspace using the quantum portion of the hybrid classical and quantum solver.

4. The method of claim 3, wherein the quantum portion comprises a quantum annealer comprising qubits.

5. The method of claim 3, further comprising: aligning seismic gathers relative to each other based on fixing an overall shift with a pilot trace for each bin of the plurality of bins.

6. The method of claim 1, wherein performing refraction-based surface consistent amplitude and phase corrections comprises:

determining long wavelength statics by generating an initial velocity model based on the one or more seismic gathers;

determining short wavelength statics based on a surface consistent inversion of the phase and amplitude residuals;

determining total refraction statics for the subsurface formation by combining the long wavelength statics and the short wavelength statics;

applying the total refraction statics to the one or more seismic gathers;

determining amplitude correction factors or deconvolution operators based on a surface consistent inversion of the phase and amplitude residuals; and applying the amplitude correction factors or the deconvolution operators to the one or more seismic gathers.

7. The method of claim 1, wherein forming one or more seismic gathers comprises:

identifying outliers in each seismic gather by performing a statistical analysis on first-break picks of each seismic gather.

8. A system for near surface analysis of seismic data, the system comprising:

a hybrid classical and quantum solver;

at least one processor and a memory storing instructions that when executed by the at least one processor cause the at least one processor to perform operations comprising:

obtaining seismic data for a subsurface formation;

forming one or more seismic gathers by sorting the seismic data into a plurality of bins based on a midpoint and an offset between a source and a receiver associated with the seismic data;

determining, using the hybrid classical and quantum solver, surface consistent refraction phase and amplitude residuals by maximizing the stack power of the one or more seismic gathers wherein a classical portion of the hybrid classical and quantum solver defines and partitions a stack power maximization and a quantum portion of the hybrid classical and quantum solver finds a maximum stack power of the partitions through quantum annealing; and performing refraction-based surface consistent amplitude and phase correction to the one or more seismic gathers by applying the surface consistent refraction phase and amplitude residuals, wherein the surface consistent refraction phase and amplitude residual correction reduces distortions in the one or more seismic gathers.

9. The system of claim 8, wherein the operations further comprise controlling hydrocarbon extraction based at least in part on the corrected one or more seismic gathers.

10. The system of claim 8, wherein determining surface consistent refraction phase and amplitude residuals comprises:

for each seismic gather, forming a discrete quadratic model representing a stack power of the seismic gather;

partitioning the stack power maximization by defining solution subspaces of the discrete quadratic model using the classical portion of the hybrid classical and quantum solver; and determining a global stack power maximum for each solution subspace using the quantum portion of the hybrid classical and quantum solver.

11. The system of claim 10, wherein the quantum portion of the hybrid classical quantum solver comprises a quantum annealer comprising qubits.

12. The system of claim 10, wherein the operations further comprise:

aligning seismic gathers relative to each other based on fixing an overall shift with a pilot trace for each bin of the plurality of bins.

13. The system of claim 8, wherein performing refraction-based surface consistent amplitude and phase corrections comprises:

determining long wavelength statics by generating an initial velocity model based on the one or more seismic gathers;

determining short wavelength statics based on a surface consistent inversion of the phase and amplitude residuals;

determining total refraction statics for the subsurface formation by combining the long wavelength statics and the short wavelength statics;

applying the total refraction statics to the one or more seismic gathers;

determining amplitude correction factors or deconvolution operators based on a surface consistent inversion of the phase and amplitude residuals; and applying the amplitude correction factors or the deconvolution operators to the one or more seismic gathers.

14. The system of claim 8, wherein forming one or more seismic gathers comprises:

identifying outliers in each seismic gather by performing a statistical analysis on first-break picks of each seismic gather.

15. One or more non-transitory, machine-readable storage devices storing instructions for near surface analysis of seismic data, the instructions being executable by one or more processors, to cause performance of operations comprising:

obtaining seismic data for a subsurface formation;

forming one or more seismic gathers by sorting the seismic data into a plurality of bins based on a midpoint and an offset between a source and a receiver associated with the seismic data;

determining, using a hybrid classical and quantum solver, surface consistent refraction phase and amplitude residuals by maximizing the stack power of the one or more seismic gathers wherein a classical portion of the hybrid classical and quantum solver defines and partitions a stack power maximization and a quantum portion of the hybrid classical and quantum solver finds a maximum stack power of the partitions through quantum annealing; and performing refraction-based surface consistent amplitude and phase correction to the one or more seismic gathers by applying the surface consistent refraction phase and amplitude residuals, wherein the surface consistent refraction phase and amplitude residual correction reduces distortions in the one or more seismic gathers.

16. The one or more non-transitory, machine-readable storage devices of claim 15, where in the operations further comprise controlling hydrocarbon extraction based at least in part on the corrected one or more seismic gathers.

17. The one or more non-transitory, machine-readable storage devices of claim 15, wherein determining surface consistent refraction phase and amplitude residuals comprises:

for each seismic gather, forming a discrete quadratic model representing a stack power of the seismic gather;

partitioning the stack power maximization by defining solution subspaces of the discrete quadratic model using the classical portion of the hybrid classical and quantum solver; and determining a global stack power maximum for each solution subspace using the quantum portion of the hybrid classical and quantum solver.

18. The one or more non-transitory, machine-readable storage devices of claim 17, wherein the quantum portion comprises a quantum annealer comprising qubits.

19. The one or more non-transitory, machine-readable storage devices of claim 17, wherein the operations further comprise:

aligning seismic gathers relative to each other based on fixing an overall shift with a pilot trace for each bin of the plurality of bins; and wherein forming one or more seismic gathers comprises identifying outliers in each seismic gather by performing a statistical analysis on first-break picks of each seismic gather.

20. The one or more non-transitory, machine-readable storage devices of claim 15, wherein performing refraction-based surface consistent amplitude and phase corrections comprises:

determining long wavelength statics by generating an initial velocity model based on the one or more seismic gathers;

determining short wavelength statics based on a surface consistent inversion of the phase and amplitude residuals;

determining total refraction statics for the subsurface formation by combining the long wavelength statics and the short wavelength statics;

applying the total refraction statics to the one or more seismic gathers;

determining amplitude correction factors or deconvolution operators based on a surface consistent inversion of the phase and amplitude residuals; and applying the amplitude correction factors or the deconvolution operators to the one or more seismic gathers.

* * * * *